US012792308B2

(12) United States Patent
Boyd et al.

(10) Patent No.: US 12,792,308 B2
(45) Date of Patent: Nov. 10, 2026

(54) KERNEL DECOMPOSITION AND ACTIVATION BROADCASTING IN DEEP NEURAL NETWORKS (DNNS)

(71) Applicant: Intel Corporation, Santa Clara, CA (US)

(72) Inventors: Richard Boyd, Ballynahinch (GB); David Thomas Bernard, Kilcullen (IE); Deepak Abraham Mathaikutty, Chandler, AZ (US); Martin Power, Dublin (IE); Niall Hanrahan, Galway (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/934,265

(22) Filed: Sep. 22, 2022

(65) Prior Publication Data

US 2023/0008622 A1 Jan. 12, 2023

(51) Int. Cl.

| | |
|---|---|
| ***G06F 7/50*** | (2006.01) |
| ***G06F 7/544*** | (2006.01) |
| ***G06F 17/16*** | (2006.01) |
| ***G06N 3/045*** | (2023.01) |
| ***G06N 3/0464*** | (2023.01) |

(Continued)

(52) U.S. Cl.

CPC ............ *G06F 7/5443* (2013.01); *G06F 17/16* (2013.01); *G06N 3/045* (2023.01); *G06N 3/0464* (2023.01); *G06N 3/063* (2013.01); *G06N 3/08* (2013.01)

(58) Field of Classification Search

CPC ....... G06F 7/5443; G06F 17/16; G06N 3/045; G06N 3/0464; G06N 3/063; G06N 3/08

See application file for complete search history.

(56) References Cited

U.S. PATENT DOCUMENTS

| | | | | |
|---|---|---|---|---|
| 9,747,546 | B2 * | 8/2017 | Ross | G06F 15/8046 |
| 10,699,160 | B2 * | 6/2020 | Lee | G06N 3/04 |

(Continued)

OTHER PUBLICATIONS

Krizhevsky, Alex et al "ImageNet Classification with Deep Convolutional Neural Networks", Communications of the ACMvol. 60Issue 6Jun. 2017 pp. 84-90, retrieved from https://doi.org/10.1145/3065386 on Sep. 22, 2022.

(Continued)

*Primary Examiner* — Corey S Faherty

(74) *Attorney, Agent, or Firm* — Akona IP PC

(57) ABSTRACT

An DNN accelerator may perform 1×N kernel decomposition to decompose a convolutional kernel into kernel vectors, each of which includes multiple weights. Through the kernel decomposition, a weight operand may be generated from a filter. The DNN accelerator converts an input tensor into input operands. An input operand includes activations and has the same size as the weight operand. The DNN accelerator may read a first activation in the input operand from memory to an internal memory of a first PE and read a second activation in the input operand from the memory to an internal memory of a second PE. The first PE may receive the second activation from the second PE through activation broadcasting between the two PEs and perform MAC operations on the input operand and weight operand. The second PE may perform MAC operations on another input operand in the input tensor and the weight operand.

22 Claims, 14 Drawing Sheets

(51) Int. Cl.
*G06N 3/063* (2023.01)
*G06N 3/08* (2023.01)

(56) References Cited

U.S. PATENT DOCUMENTS

| | | | | |
|---|---|---|---|---|
| 2018/0322390 | A1 | 11/2018 | Das et al. | |
| 2020/0159813 | A1* | 5/2020 | Ross | G06F 17/16 |
| 2021/0350205 | A1* | 11/2021 | Yan | G06N 3/082 |
| 2023/0057387 | A1* | 2/2023 | Kamalakara | G06N 3/08 |

OTHER PUBLICATIONS

Sandler, Mark et al "MobileNetV2: Inverted Residual and Linear Bottlenecks", Proc. IEEE Comput. Soc. Conf. Comput. Vis. Pattern Recognit., pp. 4510-4520, Jan. 2018.
Tan, Mingxing et al "EfficientNet: Rethinking Model Scaling for Convolutional Neural Networks", 36th Int. Conf. Mach. Learn. ICML 2019, vol. Jun. 2019, pp. 10691-10700, May 2019.
Zhang, P. et al "High Performance Depthwise and Pointwise Convolutions on Mobile Devices", Association for the Advancement of Artificial Intelligence (www.aaai.org), retrieved from https://doi.org/10.48550/arXiv.2001.02504 on Sep. 21, 2022.

* cited by examiner

| | T0 | T1 | T2 | T3 | T4 | T5 | T6 | T7 | T8 | T9 | T10 | T11 | T12 | T13 | T14 | T15 | T16 | T17 |
|---|---|---|---|---|---|---|---|---|---|---|---|---|---|---|---|---|---|---|
| PE0 | X0 | X1 | X2 | | X4 | X5 | X6 | | X8 | X9 | X10 | | X12 | X13 | X14 | | | |
| PE1 | | X1 | X2 | X3 | | X5 | X6 | X7 | | X9 | X10 | X11 | | X13 | X14 | X15 | | |
| PE2 | | | X2 | X3 | X4 | | X6 | X7 | X8 | | X10 | X11 | X12 | | X14 | X15 | X16 | |
| PE3 | | | | X3 | X4 | X5 | | X7 | X8 | X9 | | X11 | X12 | X13 | | X15 | X16 | X17 |
| Re-use Rate | 1 | 2 | 3 | 3 | 3 | 3 | 3 | 3 | 3 | 3 | 3 | 3 | 3 | 3 | 3 | 3 | 2 | 1 |

FIG. 8

KERNEL DECOMPOSITION AND ACTIVATION BROADCASTING IN DEEP NEURAL NETWORKS (DNNS)

TECHNICAL FIELD

This disclosure relates generally to neural networks, and more specifically, to kernel decomposition and activation broadcasting in DNNs.

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiple-accumulate) operations as well as hundreds of millions of weight operand weights to be stored for classification or detection. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 illustrates another example process of broadcasting activations between PEs, in accordance with various embodiments.

DETAILED DESCRIPTION

Overview

Figure 1:
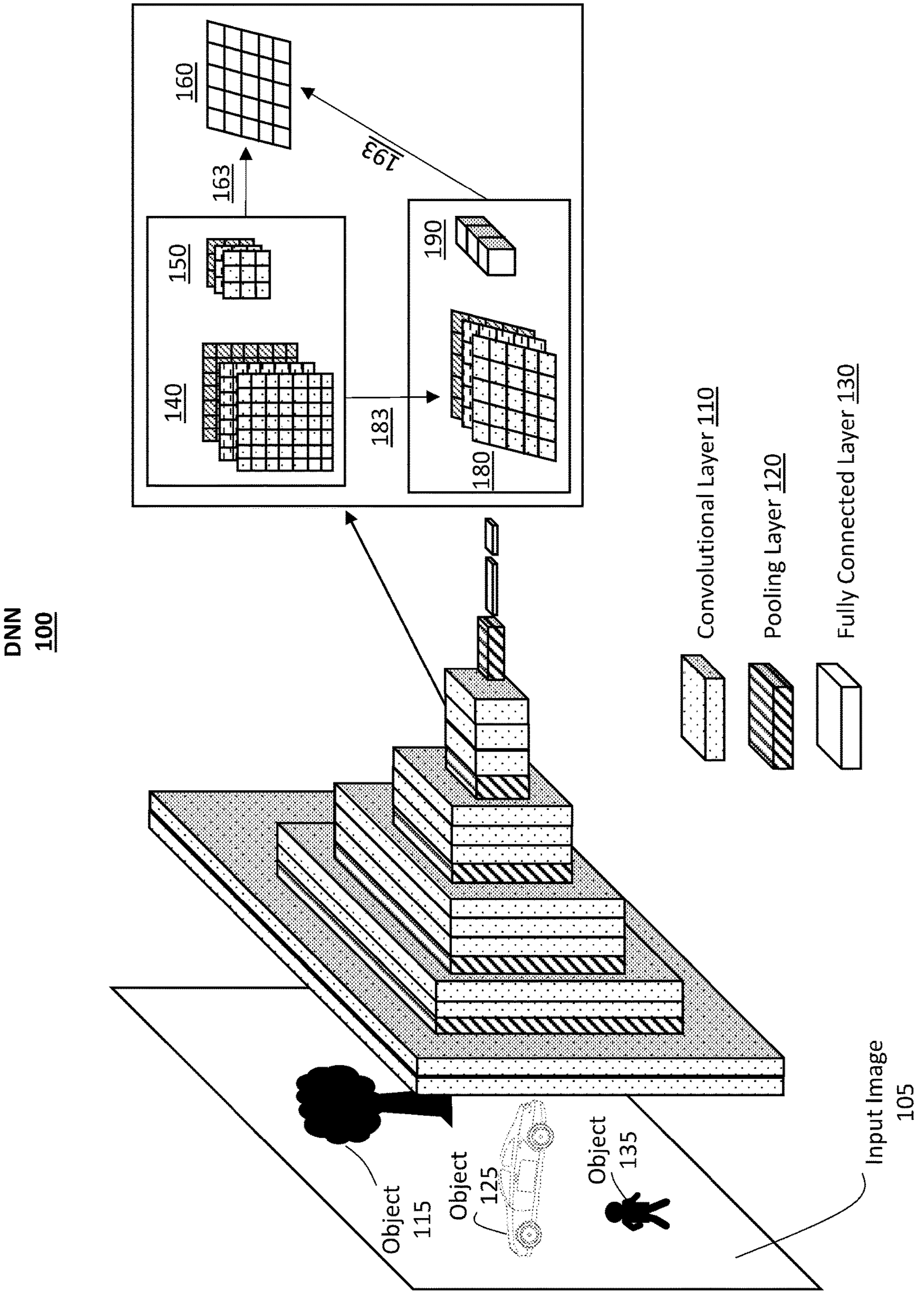
FIG. 1 illustrates an example layer structure of a DNN, in accordance with various embodiments.

DNNs are widely used in the domains of computer vision, speech recognition, image, and video processing mainly due to their ability to achieve beyond human-level accuracy. However, the improvements in accuracy come at the expense of significant computation cost. The underlying DNNs have extremely high computing demands as each input requires at least hundreds of millions of MAC operations as well as hundreds of millions of weight operand weights to be processed for classification or detection. Energy constrained mobile systems and embedded systems, where energy and area budgets are extremely limited, often use area and energy efficient DNN accelerators as the underlying hardware for executing machine learning applications.

Sparsity can be leveraged in DNN accelerators that perform convolutions, such as depthwise convolution, in which existing convolution hardware may be reused. However, the depthwise convolution by sparsity method can limit the amount of processing performed by each MAC unit (also referred to as PE). In many cases, 1/16 of the PEs in the DNN accelerator are utilized. In other words, the utilization or efficiency of the DNN accelerator is limited to a maximum of 6.25% in theory but even lower in practice. The efficiency of the DNN accelerator can be even lower due to an increase in bandwidth demands. Currently available DL technologies can make effective reuse of sparse convolution hardware but has no activation reuse and therefore, fails to effectively enhance efficiency of DNN accelerators. Thus, improved technology for enhancing efficiency of DNN accelerators is needed.

Embodiments of the present disclosure may improve on at least some of the challenges and issues described above by providing DNN accelerators that facilitate 1×N kernel decomposition and activation broadcasting. An example DNN accelerator can convert a H×W kernel of a convolution into 1×N kernel vectors, where H is the height of the kernel and may equal the number of weights in a column in the kernel, and W is the width of the kernel and may equal the number of weights in a row in the kernel. A kernel vector includes N weights. N is an integer that is larger than 1 but not larger than W. In embodiments where N is not an integral divisor of W, the DNN accelerator may add dummy weights to the kernel. The dummy weights may be arranged in one or more columns to increase W so that N can be an integral divisor of W.

With the 1×N kernel decomposition, the DNN accelerator converts an input tensor of the convolution into input operands, and an input operand may include N activations. The DNN accelerator may not need to go through the kernel-X loop as it effectively folds the kernel-X loop into the spatial X loop that steps across the input tensor. Also, as the kernel slides across the input tensor during the convolution, different input operands, which is to be processed by different PEs, may include a same activation. The activation can be read into the internal memory of one of the PEs and broadcasted from the PE to the other PE(s). This way, the number of read operations needed for the convolution can be reduced.

In an example convolution where an input tensor has a width of 18 activations and the kernel is a 3×3 kernel, the kernel may be decomposed into 1×3 kernel vectors. The input tensor may be decomposed into 16 input operands, and an input operand may include 3 activations. The 18 activations can be loaded into a PE array through 18 read operations. Then the activations can be broadcasted between PEs in the PE array. In contrast, a DNN accelerator, which does not facilitate activation broadcasting, needs to perform 48 (which equals 16 times 3) read operations. Also, for a DNN accelerator that performs the conventional 1×1 kernel decomposition, the DNN accelerator would decompose the input tensor into 18×18=324 (assuming the height of the input tensor is the same as its width) input operands, which can require 324 read operations.

Thus, the 1×N kernel decomposition and activation broadcasting in the present disclosure can significantly reduce the number of read operations and therefore, reduces the number of memory accesses and bandwidth demands in convolutions. This can be beneficial for depthwise convolution, which is typically limited by memory bandwidth. Also, the activation broadcasting between PEs can also increase the utilization of PEs. Compared with currently available DNN accelerators, the DNN accelerator in the present disclosure can have much better efficiency and performance.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN Layer Structure

FIG. 1 illustrates an example layer structure of a DNN 100, in accordance with various embodiments. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as IFM (input feature map) 140) and a filter 150. As shown in FIG. 1, the IFM 140 is represented by a 7×7×3 3D matrix. The IFM 140 includes 3 input channels, each of which is represented by a 7×7 2D array. The 7×7 2D array includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D array of weights, where the weights are arranged in columns and rows. A kernel can be smaller than the IFM. In the embodiments of FIG. 1, each kernel is represented by a 3×3 2D array. The 3×3 kernel includes 3 weights in each row and 3 weights in each column. Weights can be initialized and updated by backpropagation using gradient descent. The magnitudes (i.e., values) of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as OFM (output feature map) 160). The OFM 160 is represented by a 5×5 2D array. The 5×5 2D array includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D array of output elements. As such, the 2D output array (i.e., the OFM 160) from the standard convolution 163 is referred to an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D array. The 5×5 2D array includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculates the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kerneled again by a further subsequent convolutional layer 110, and so on.

In some embodiments, a convolutional layer 110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presents of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input operand. The input operand defines the output of the convolutional layers 110 and pooling layers 120 and includes the values of the last feature map generated by the last pooling layer 120 in the sequence. The fully connected layers 130 applies a linear combination and an activation function to the input operand and generates an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and returns an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example Convolution

Figure 2:
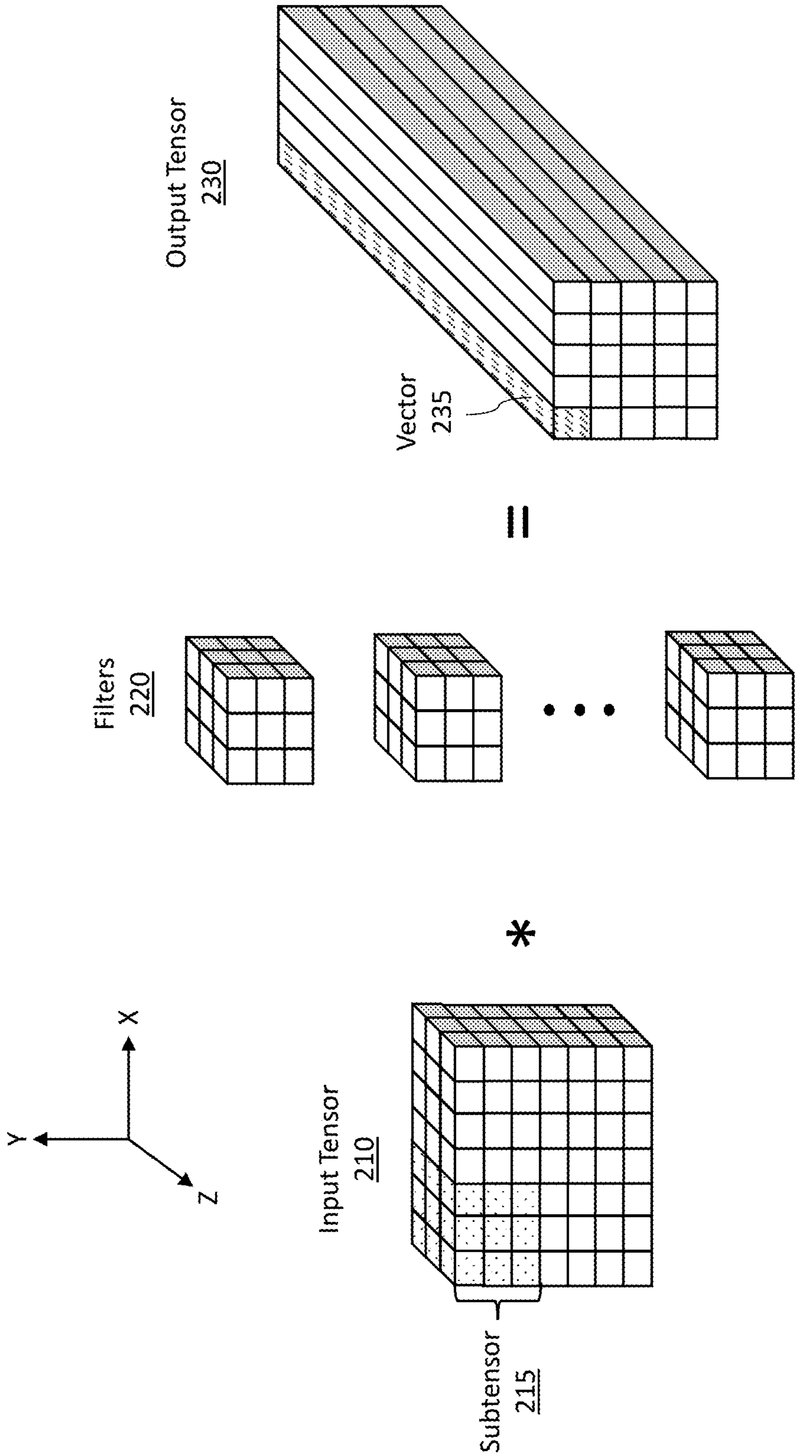
FIG. 2 illustrates an example convolution, in accordance with various embodiments.

FIG. 2 illustrates an example convolution, in accordance with various embodiments. The convolution may be a convolution in a convolutional layer of a DNN, e.g., a convolutional layer 110 in FIG. 1. The convolution can be executed on an input tensor 210 and filters 220 (individually referred to as "filter 220"). A result of the convolution is an output tensor 230. In some embodiments, the convolution is performed by a PE array, such as the PE array 340 in FIG. 3.

In the embodiments of FIG. 2, the input tensor 210 includes input elements (also referred to as "elements") arranged in a 3D matrix. Each input element in the input tensor may be represented by a (X, Y, Z) coordinate that indicates a position of the input elements in the 3D matrix. In some embodiments a (X, Y) coordinate may represent an activation in the input tensor 210 ("input activation"). The input activation may include a sequence of input elements that have the same (X, Y) coordinate but different Z coordinates. The length of an input activation may equal the depth of the input tensor 210 along the Z axis.

The input tensor 210 has a spatial size $H_{in} \times W_{in} \times C_{in}$, where $H_{in}$ is the height of the 3D matrix (i.e., the length along the Y-axis, which indicates the number of activations in a column in the 2D matrix of each input channel), $W_{in}$ is the width of the 3D matrix (i.e., the length along the X-axis, which indicates the number of activations in a row in the 2D matrix of each input channel), and $C_{in}$ is the depth of the 3D matrix (i.e., the length along the Z axis, which indicates the number of input channels). For purpose of simplicity and illustration, the input tensor 210 has a spatial size of 7×7×3, i.e., the input tensor 210 includes three input channels and each input channel has a 7×7 2D matrix.

Each filter 220 includes weights arranged in a 3D matrix. The values of the weights may be determined through training the DNN. A filter 220 has a spatial size $H_f \times W_f \times C_f$, where $H_f$ is the height of the filter (i.e., the length along the Y-axis, which indicates the number of weight in a column in each kernel), $W_f$ is the width of the filter (i.e., the length along the X-axis, which indicates the number of weights in a row in each kernel), and $C_f$ is the depth of the filter (i.e., the length along the Z axis, which indicates the number of channels). In some embodiments, $C_f$ equals $C_{in}$. For purpose of simplicity and illustration, each filter 220 in FIG. 2 has a spatial size of 3×3×3, i.e., the filter 220 includes 3 convolutional kernels with a spatial size of 3×3. The spatial size of the convolutional kernels is smaller than the spatial size of the 2D matrix of each input channel in the input tensor 210.

In the convolution, each filter 220 slides across the input tensor 210 and generates a 2D matrix for an output channel in the output tensor 230. In the embodiments of FIG. 2, the 2D matrix has a spatial size of 5×5. The output tensor 230 includes output elements (also referred to as "elements") arranged in a 3D matrix. Each output element in the output tensor may be represented by a (X, Y, Z) coordinate that indicates a position of the input elements in the 3D matrix. In some embodiments a (X, Y) coordinate may represent an activation in the output tensor 230 ("output activation"). The output activation may include a sequence of output elements that have the same (X, Y) coordinate but different Z coordinates. The length of an output activation may equal the depth of the input tensor 210 along the Z axis.

The output tensor 230 has a spatial size $H_{out} \times W_{out} \times C_{out}$, where $H_{out}$ is the height of the 3D matrix (i.e., the length along the Y-axis, which indicates the number of activations in a column in the 2D matrix of each output channel), $W_{out}$ is the width of the 3D matrix (i.e., the length along the X-axis, which indicates the number of activations in a row in the 2D matrix of each output channel), and $C_{out}$ is the depth of the 3D matrix (i.e., the length along the Z axis, which indicates the number of output channels). $C_{out}$ may equal the number of filters 220 in the convolution. $H_{out}$ and $W_{out}$ may depend on the heights and weights of the input tensor 210 and each filter 220.

In an example step of the convolution, MAC operations can be performed on a 3×3×3 subtensor 215 (which is highlighted with a dotted pattern in FIG. 2) in the input tensor and all the filters 220. The subtensor 215 has the same spatial size as each filter 220. The result of the MAC operations on the subtensor 215 and one filter 220 is an activation in the output tensor 230. The result of the MAC operations on the subtensor 215 and all the filters 220 is a vector 235 in the output tensor 230. The vector 235 has a spatial size of $1 \times 1 \times C_{out}$. The vector 235 includes a sequence of output elements, which corresponds to different output channels in the output tensor 230.

Figure 3:
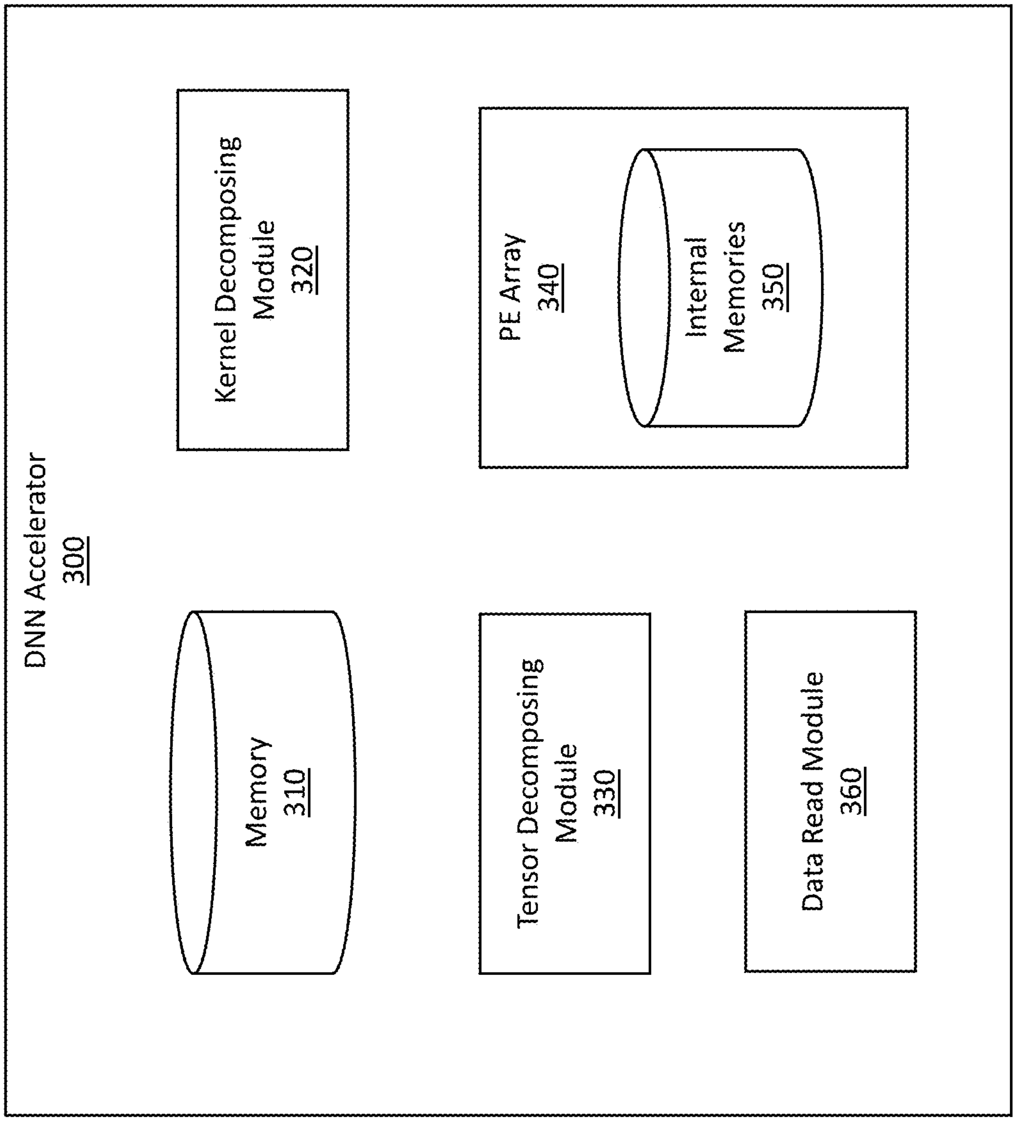
FIG. 3 is a block diagram of an example DNN accelerator, in accordance with various embodiments.
Figure 4:
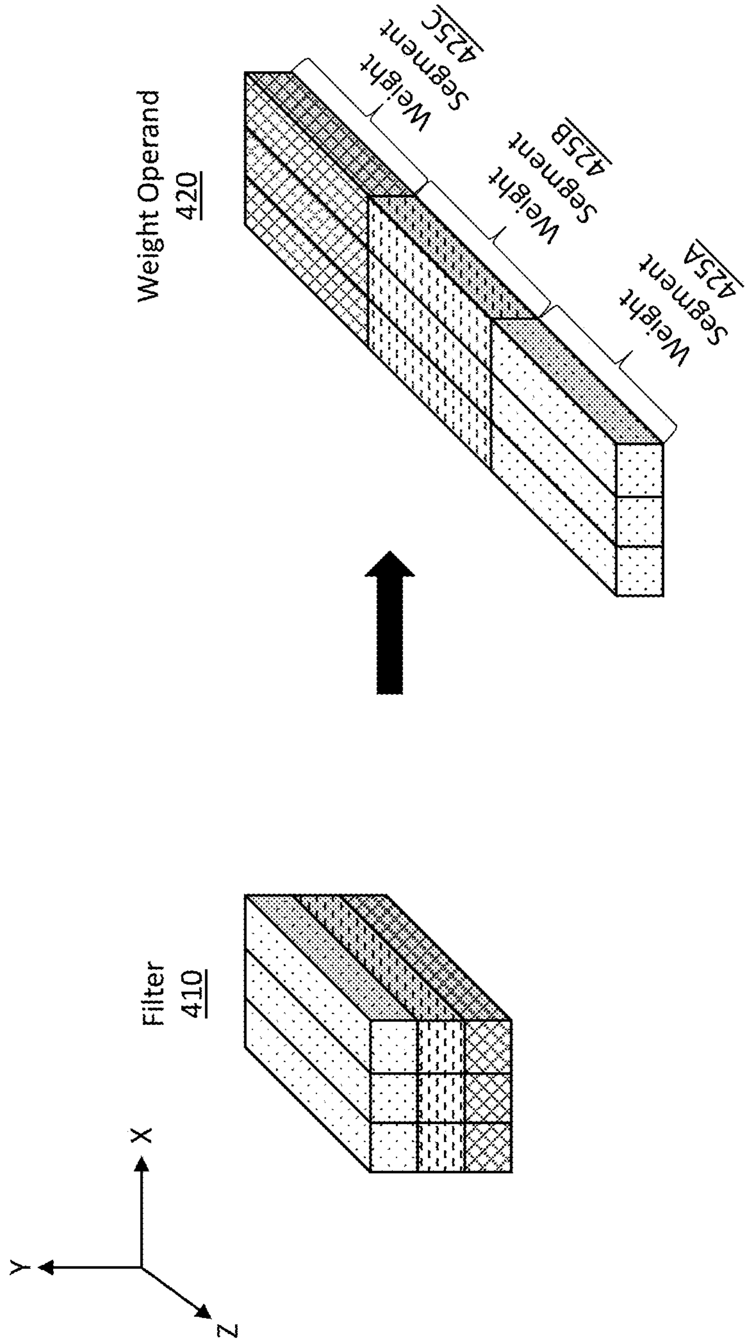
FIG. 4 illustrates an example process of decomposing a filter, in accordance with various embodiments.
Figure 5:
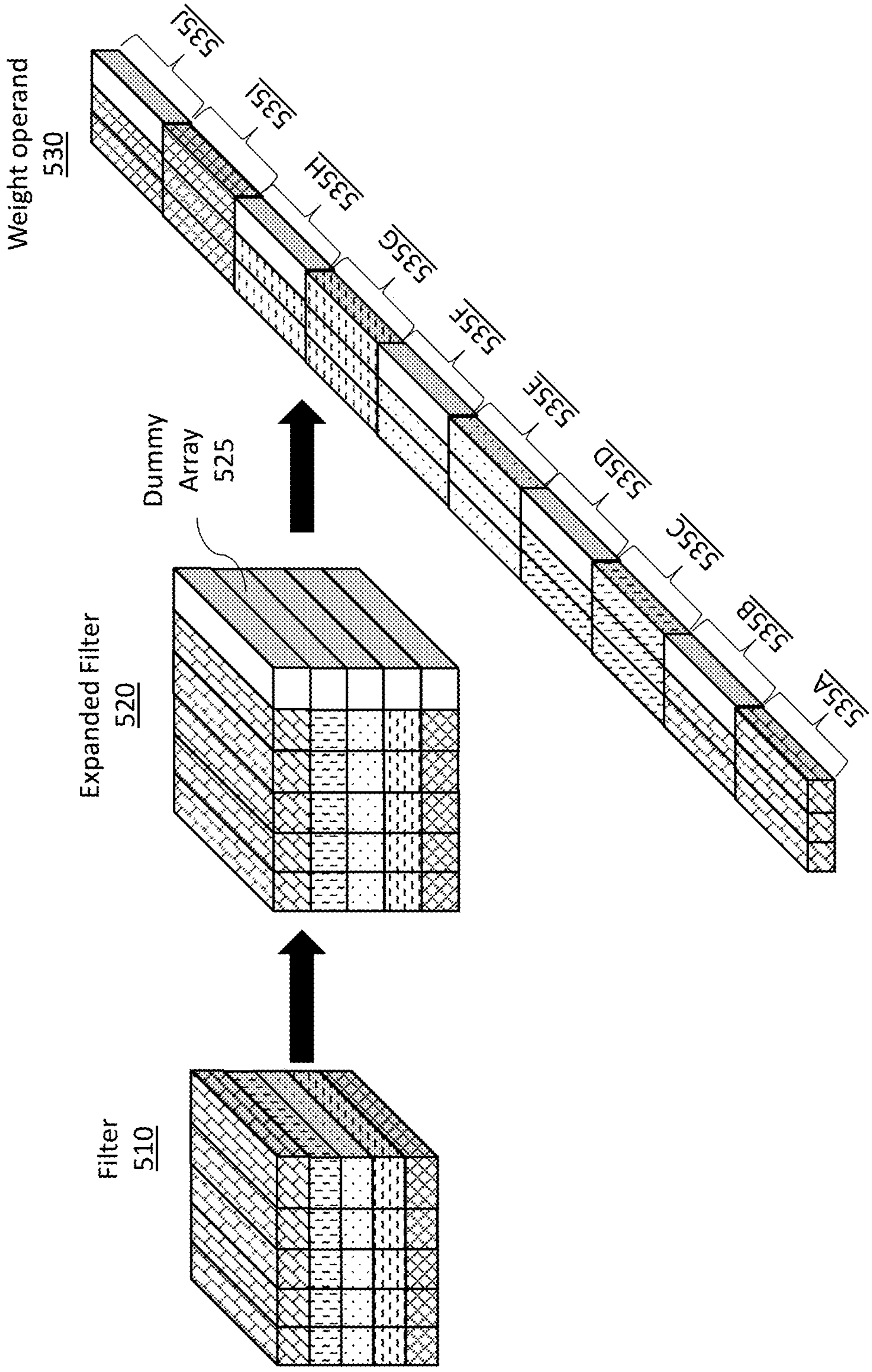
FIG. 5 illustrates another example process of decomposing a filter, in accordance with various embodiments.
Figure 6:
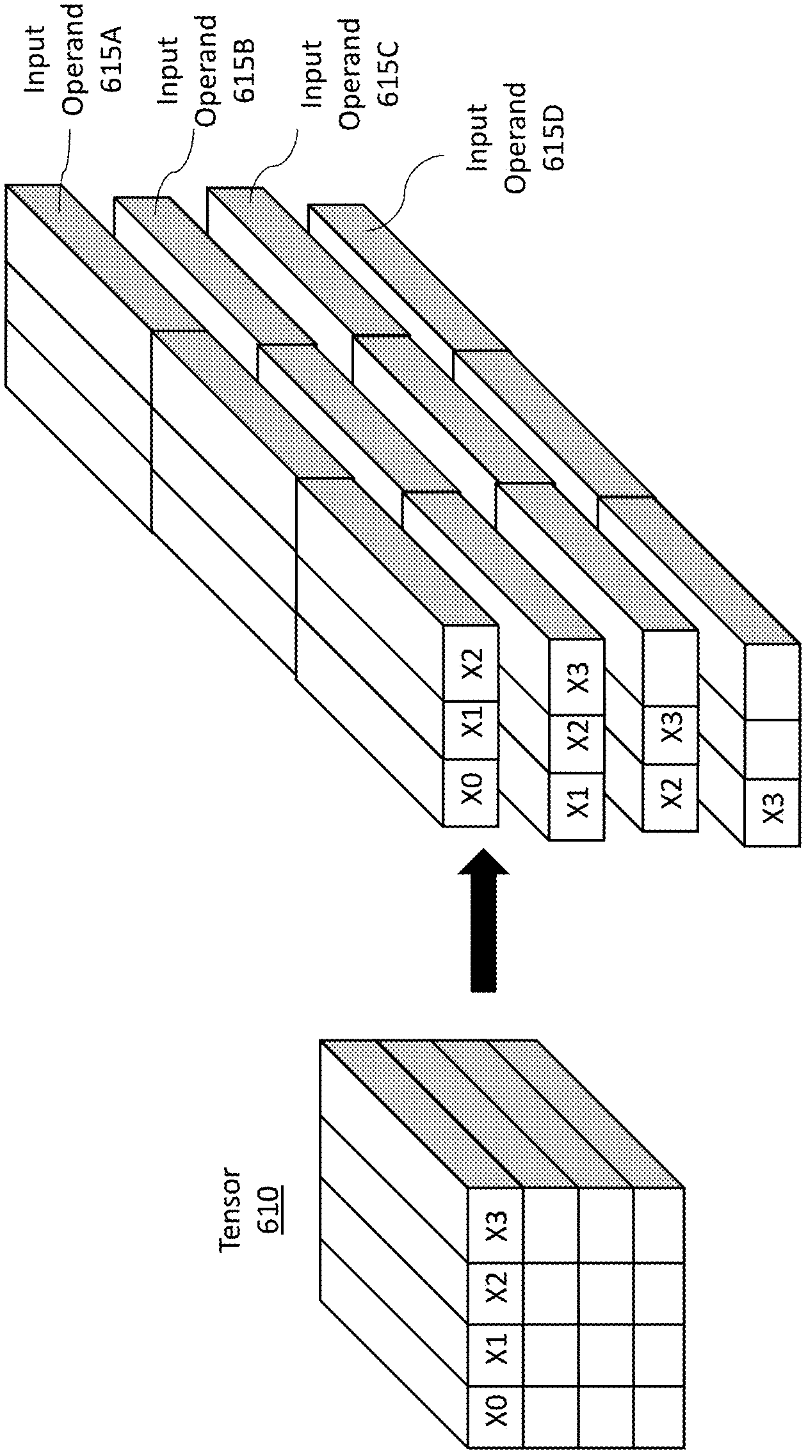
FIG. 6 illustrates an example process of decomposing an input tensor, in accordance with various embodiments.

The convolution on the input tensor 210 and filters 220 may be performed by a DNN accelerator, such as the DNN accelerator 300 in FIG. 3. The DNN accelerator includes PEs that perform MAC operations. The input tensor 210 and filters 220 may be decomposed to facilitate distribution of the workload of the convolution to the PEs in the DNN accelerator. Example processes of decomposing filter is shown in FIGS. 4 and 5. An example process of decomposing an input tensor is shown in FIG. 6.

Example DNN Accelerator

FIG. 3 is a block diagram of an example DNN accelerator, in accordance with various embodiments.

FIG. 3 is a block diagram of an example DNN accelerator 300, in accordance with various embodiments. The DNN accelerator 300 can run DNNs, e.g., the DNN 100 in FIG. 1. The DNN accelerator 300 includes a memory 310, a kernel decomposing module 320, a tensor decomposing module 330, a data read module 360, and an PE array 340 including internal memories 350 (individually referred to as "internal memory 350"). In other embodiments, alternative configurations, different or additional components may be included in the DNN accelerator 300. For instance, the DNN accelerator 300 may include more than one memory 310, more than one data read module 360, or more than one PE array 340. Further, functionality attributed to a component of the DNN accelerator 300 may be accomplished by a different component included in the DNN accelerator 300 or by a different system.

The memory 310 stores data to be used by the PE array 340 to perform DL operations in DNN models. Example DL operations include convolutions (also referred to as "convolutional operations"), pooling operations, elementwise operations, other types of DL operations, or some combination thereof. The memory 310 may be a main memory of the DNN accelerator 300. In some embodiments, the memory 310 includes one or more DRAMs (dynamic random-access memory). For instance, the memory 310 may store the input tensor, convolutional kernels, or output tensor of a convolution in a convolutional layer of a DNN, e.g., the convolutional layer 110. The output tensor can be transmitted from the internal memories 350 to the memory 310 through the data read module 360.

In other embodiments, the input tensor or output tensor is not stored in the memory 310. For instance, the input tensor may be directly transmitted from one or more internal memories of another PE array to one or more internal memories 350 of the PE array 340. The output tensor may be directly transmitted from one or more internal memories 350 in the PE array 340 into one or more internal memories of another PE array. The input tensor may be a 3D matrix and include $C_{in}$ input channels. Examples of the input tensor include the input tensor 140 in FIG. 1 or the input tensor 210 in FIG. 2. The output tensor may be a 3D matrix and include $C_{out}$ output channels. Examples of the output tensor include the output tensor 160 in FIG. 1 or the output tensor 220 in FIG. 2.

The kernel decomposing module 320 decomposes kernels for convolutions. In some embodiments, the kernel decomposing module 320 may decompose a kernel into kernel vectors. For an example kernel having a spatial size of $H_f \times W_f$ (i.e., the number of weights in a column in the kernel is $H_f$, and the number of weights in a row in the kernel is $W_f$), the kernel decomposing module 320 may decompose the kernel into kernel vectors, each of which has a spatial size of 1×N, where N is an integer that is larger than 1 but not larger than $W_f$. In embodiments where N is an integral divisor of $W_f$, meaning $W_f/N$ is an integer, the kernel decomposing module 320 may divide each row of the kernel into $W_f/N$ kernel vectors.

The kernel vectors may be rearranged to form a weight operand. For instance, a kernel vector may correspond to a weight segment. The weight segment may include all the channels in the filter of the convolution. A spatial size of a weight segment may be $1 \times N \times C_f$. The weight segments may be arranged linearly along the channel axis to form a 2D array having a spatial size of $$1 \times N \times \left(\frac{W_f}{N} * H_f * C_f\right).$$

The 2D array is the weight operand. Even though the spatial size of the weight operand is different from the spatial size of the filter, the weight operand has the same number of weights as the filter.

In embodiments where N is not an integral divisor of $W_f$, meaning $W_f/N$ is not an integer, the kernel decomposing module 320 may add dummy weights into the kernel to expand the width of the kernel. For instance, the kernel decomposing module 320 may added one or more columns of dummy weights to an edge of the kernel, e.g., to the right edge of the kernel. The expanded kernel has a spatial size of $H_f \times W_{ef}$, where $W_{ef}$ is larger than $W_f$ and N is an integral divisor of $W_{ef}$. The kernel decomposing module 320 can further convert each row of the expanded kernel into one or more kernel vectors. Some of the kernel vectors include one or more dummy weights. The weight operand has a spatial size of $$1 \times N \times \left(\frac{W_{ef}}{N} * H_f * C_f\right).$$

To ensure that the addition of the dummy weight will not influence the result of the convolution, the kernel decomposing module 320 may set the values of the dummy weights to zero or provide information to the PE array 340 so that the PE array 340 skips the dummy weights in the execution of the convolution. In embodiment, the kernel decomposing module 320 may manipulate a sparsity bitmap for the kernel or for the input tensor of the convolution. For instance, the kernel decomposing module 320 may set values of bits in the sparsity bitmap that correspond to the dummy weight to zero, so that when the PE array 340 performs the convolution based on the sparsity bitmap, the dummy weights will be skipped. In another embodiments, the kernel decomposing module 320 may use programed configuration registers, such as workload type, tension dimension, kernel dimension, etc., to instruct the PE array 340 to skip the dummy weights.

Alternative or in addition to adding dummy weights, the kernel decomposing module 320 may transpose the kernel. For instance, the kernel decomposing module 320 may determine that N is not an integral divisor of $W_f$ but N is an integral divisor of $H_f$. Then the kernel decomposing module 320 may transpose columns of the kernel to rows. $H_f$ becomes the width of the transposed kernel. The kernel decomposing module 320 may decompose the transposed kernel into 1×N kernel vectors. In embodiments where the kernel is transposed, the kernel decomposing module 320 may instruct the tensor decomposing module 330 to transpose the input tensor of the convolution accordingly, so that the transposing of the kernel would not influence the result of the convolution. Also, the output of the convolution, which is performed on the transposed kernel and the transposed input tensor, may need to be further process before the output is to be used for further DL operation.

The tensor decomposing module 330 decomposes an input tensor of a convolution based on the decomposing of the kernel of the convolution done by the kernel decomposing module 320. The tensor decomposing module 330 may decompose the input tensor into a plurality of input operands. An input operand may have a same layout and spatial size as the corresponding weight operand generated by the kernel decomposing module 320. In the example where the spatial size of a weight operand is $$1\times N\times\left(\frac{W_f}{N}*H_f*C_f\right),$$

the spatial size of an input operand is $$1\times N\times\left(\frac{W_f}{N}*H_f*C_{in}\right),$$

where $C_{in}$ equals $C_f$.

Different input operands may be provided to different PEs in the PE array 340. These PEs may receive the same weight operand. In some embodiments, a PE performs MAC operations on an input operand and the weight operation to produce an output activation in the output tensor of the convolution. In embodiments where the weight operation is generated through 1×N kernel decomposition, the input operand may include 1×N activations so that the spatial size of the input operand can match the spatial size of the weight operand. Some of the 1×N activations may be included in one or more other input operands processed by one or more other PEs. These PEs can share activations. For instance, an input activation read into a PE can be transmitted from this PE to other PEs so that the other PEs can use the same input activation to perform MAC operations, which can avoid reading the same input activation into all the PEs through multiple read operations. The transmission of activations among different PEs inside the PE array 340 is referred to as activation broadcasting. The 1×N kernel decomposition performed by the kernel decomposing module 320 makes activation broadcasting possible, which enables the DNN accelerator 300 to have better performance than currently available DNN accelerators.

Currently available DNN accelerators typically performs 1×1 kernel decomposition, which requires that an input tensor is decomposed into 1×1 activations. As a result, a PE in such a DNN accelerator processes a single activation and does not share any activation with other PEs. Each PE must receive its activation through reading the activation from the memory 310. Thus, the number of read operations required in currently available DNN accelerators can be significantly more than the number of read operations required in the DNN accelerator 300 for performing the same convolution.

The PE array 340 performs computation for DL operations. The PE array 340 may run the operations in a DNN layer, or a portion of the operations in the DNN layer. In some embodiments, the operations of the DNN layers may be run by one or more other compute tiles in parallel with the PE array 340. The PE array 340 may perform convolutions, e.g., standard convolution or depthwise convolution. In some embodiments, the PE array 340 receive an input tensor and a kernel and performs a convolution based on the input tensor and kernel. The result of the convolution may be an output tensor, which can be further computed, e.g., by the PE array 340 or one or more other PE arrays.

The PE arrays 340 includes PEs arranged in columns, or columns and rows. Some or all of the PEs may be activated for a convolution. An activated PE is a PE that performs MAC operations in the convolution. The workload of a convolution may be partitioned and distributed to the activated PEs. In some embodiments, an activated PE may perform MAC operations on an input operand and a weight operand, which are generated from decomposing the input tensor and kernel, respectively, of the convolution. An activated PE may receive multiple input operands and multiple weight operands and perform multiple rounds of MAC operations in the convolution. Results of MAC operations of the PEs may be aggregated to produce the output tensor (or a portion of the output tensor) of the convolution.

The internal memories 350 store data used for and generated from MAC operations by the PE array 340. In the embodiments of FIG. 3, the internal memories 350 are inside the PE array 340. In other embodiments, the internal memories 350 may be outside the PE array 340. The internal memories 350 and the PE array 340 can be implemented on the same chip. In some embodiments, the internal memories 350 includes one or more SRAMs (static random-access memories). The internal memories 350 may be register files.

Each PE in the PE array 340 may be associated with one or more internal memories 350. For instance, a PE may have an activation memory for storing activations, a weight memory for storing weights, and an output memory for storing output elements. An input operand for the PE may be stored in the activation memory, a weight operand for the PE may be stored in the weight memory, and results of MAC operations of the PE may be stored in the output memory. In some embodiments, such as embodiments where the internal memories 350 are register files, the activation memory may be referred to as an input register file (e.g., the input register file 1040 in FIG. 10), the weight memory may be referred to as a weight register file (e.g., the weight register file 1050 in FIG. 10), and the output memory may be referred to as an output register file (e.g., the output register file 1060 in FIG. 10).

Input activations may be broadcasted between internal memories 350 of different PEs. For instance, an activation stored in the activation memory of a PE may be transmitted from the activation memory to one or more other activation memories for one or more other PEs. The activation memory of the PE may also receive one or more activations from one or more other PEs. With activation broadcasting, an activation can be read into one activation memory of one PE and then broadcasted to other activation memories, as opposed to being read into the activation memories of all the PEs that need the activation. This way, the number of read operations by the data read module 360 can be significantly reduced, and the efficiency of the DNN accelerator 300 can be improved.

The data read module 360 facilitates data transfer between the memory 310 and the internal memories 350. For example, the data read module 360 can read data from the memory 310 and write data into the internal memories 350. As another example, the data read module 360 can read data from the internal memories 350 and write data into the memory 310. The data read module 360 provides a direct memory access feature that allows the PE array 340 to initiate data transfer between the memory 310 and the internal memories 350 and to perform other operations while the data transfer is in being conducted.

In some embodiments, the data read module 360 may be associated with a number of data loading lanes for loading data into the PE array 340, e.g., into a PE column in the PE array 340. The loading bandwidth of the PE column is an aggregation of the loading bandwidths of all the data loading lanes associated with the PE column. With a certain number of data loading lanes, data can be fed into the same number of independent MAC units simultaneously. These independent MAC units may be in the same PE. In some embodiments where a PE column has four data loading lanes for feeding activations or weights into the PE column and each data loading lane may have a bandwidth of 16 bytes, the four data loading lanes can have a total loading bandwidth of 64 bytes. In an embodiment, four PEs in the PE array 340 may data through the four data loading lanes in the same read operation by the data read module 360.

In some embodiments (such as embodiments where activation broadcasting occurs), the data read module 360 may read different activations in an input operand into the activation memories of different PEs. For instance, the data read module 360 may read a first activation in the input operand into a first PE, read a second activation in the input operand into a second PE, and read a third activation in the input operand into a third PE. The first PE can receive the second activation and third activation from the second PE and the third PE, respectively, to complete the MAC operations for the input operand. The second activation may be included in a second input operand, with which the second PE performs MAC operations. The second PE may receive other activations in the second input operand from one or more other PEs, such as the third PE. Similarly, the third activation may be included in a third input operand, with which the third PE performs MAC operations. The third PE may receive other activations in the third input operand from one or more other PEs. In an embodiment where an input operand includes N activations, the data read module 360 may perform N read operations, in each of which the data read module 360 reads one activation into an activation memory.

FIG. 4 illustrates an example process of decomposing a filter 410, in accordance with various embodiments. For purpose of simplicity and illustration, the filter 410 has a 3×3 kernel. The depth of the filter 410 in the Z axis is the number of channels in the filter 410, which is denoted as $C_f$. The filter 410 is converted to a weight operand 420 through decomposing, e.g., by the kernel decomposing module 320 in FIG. 3. The weight operand 420 includes all the weights in the filter 410, but the weights are arranged in a different layout. As shown in FIG. 4, the filter 410 is a 3D matrix having a spatial size of $3\times3\times C_f$, but the weight operand 420 is a 2D array having a spatial size of $1\times3\times3C_f$.

The weight operand 420 includes three weight segments 425A-415C (collectively referred to as "weight segments 425" or "weight segment 425"). Each weight segment 425 has a spatial size of $1\times3\times C_f$. As shown in FIG. 4, the weight segment 425A is includes the three weights in the top row of the kernel, the weight segment 425B is includes the three weights in the middle row of the kernel, and weight segment 425A is includes the three weights in the bottom row of the kernel. The weight segments 425 are arranged one after another along the Z axis based on the Y coordinates of the weights, e.g., the weight segment 425B is arranged between the weight segment 425A and the weight segment 425C.

In some embodiments, the weight operand 420 may be provided to a PE, e.g., stored in a weight memory of the PE, and be used by the PE to perform MAC operations and produce an output element in the output tensor of the convolution. The weights in the weight operand 420 may be provided to the PE sequentially, e.g., based on the (X, Y) coordinates of the weights. In an example where the weight segment 425A includes weights at (0, 0), (1, 0), and (2,0), the weights at (0, 0) in the weight segment 425A are sent to the PE first for a first round of MAC operation. After that, the (1, 0) weights can be sent to the PE for a second round of MAC operation, followed by the (2, 0) weights for a second round of MAC operation. After the weight segment 425A is done, the weights in the weight segment 425B can be sent to the PE for more MAC operations, followed by the weight segment 425C. In other embodiments, the weight operand 420 may be provided to multiple PEs. For instance, the weight segments 425 may be provided to three different PEs. A PE can process one weight segment 425. The output of the three different PEs may be accumulated by an accumulated associated with the three PEs to produce the output element.

FIG. 5 illustrates another example process of decomposing a filter, in accordance with various embodiments. For purpose of simplicity and illustration, the filter 510 has a 5×5 kernel. The depth of the filter 510 in the Z axis is the number of channels in the filter 510, which is denoted as $C_f$. The filter 510 is converted to a weight operand 530 through decomposing, e.g., by the kernel decomposing module 320 in FIG. 3. The weight operand 530 includes all the weights in the filter 510, but the weights are arranged in a different layout. As shown in FIG. 5, the filter 510 is a 3D matrix having a spatial size of $5\times5\times C_f$, but the weight operand 530 is a 2D array having a spatial size of $1\times3\times10C_f$.

In the embodiments of FIG. 5, the kernel decomposing module 320 decomposes the 5×5 into 1×3 kernel vectors. As 3 is not an integral divisor of 5, the kernel decomposing module 320 adds a dummy array 525 to the filter 510 to generate an expanded filter 520. The dummy array 525 is an array of dummy weights and has a spatial size of $5\times1\times C_f$. The dummy array 525 is added to the right edge of the filter 510 and becomes the most right column of the expanded filter 520. The expanded filter 520 has a spatial size of $5\times6\times C_f$, i.e., the expanded filter 530 has a 5×6 expanded kernel. As 3 is an integral divisor of 6, the kernel decomposing module 320 can divide the expanded kernel into 1×3 kernel vectors.

As shown in FIG. 5, the kernel decomposing module 320 divides each row in the expanded filter 520 into two 1×3 kernel vectors. The second 1×3 kernel vector from each row has a dummy weight. The 1×3 kernel vectors correspond to the weight segments 535A-535J (collectively referred to as "weight segments 535" or "weight segment 535"). Each weight segment 535 has a spatial size of $1\times3\times C_f$. The weight segments 535 are arranged one after another along the Z axis based on the X and Y coordinates of the weights.

In some embodiments, the weight operand 530 may be provided to a PE, e.g., stored in a weight memory of the PE, and be used by the PE to perform MAC operations and produce an output element in the output tensor of the convolution. In other embodiments, the weight operand 530 may be provided to multiple PEs. For instance, the weight segments 535 may be provided to three different PEs. A PE can process one weight segment 535.

FIG. 6 illustrates an example process of decomposing a tensor 610, in accordance with various embodiments. The tensor 610 may be an input tensor of a convolution, or a portion of the input tensor. For purpose of illustration, the tensor 610 has a spatial size of $4\times4\times C_{in}$. Each row in the tensor 610 has four activations, shown as X0, X1, X2, and X3 in FIG. 6. For purpose of simplicity and illustration, FIG. 6 does not show Y coordinates of the activations. The tensor 610 is decomposed into four input operands 615A-615D (collectively referred to as "input operands 615" or "input operand 615").

The tensor 610 may be decomposed by the tensor decomposing module 330 based on a kernel decomposition performed by the kernel decomposing module 320. In the embodiments of FIG. 6, the kernel decomposition is a 1×3 kernel decomposition, and each input operand includes 1×3 activations. As shown in FIG. 6, the input operand 615A includes activations X0, X1, and X2. The input operand 615B includes activations X1, X2, and X3. The input operand 615C includes activations X2 and X3. The input operand 615D includes activation X3. The input operands

615 may be provided to four PEs for performing MAC operations. The input operands 615 share same activations. For instance, activation X1 is in the input operands 615A and 615B, activation X2 is in the input operands 615A-615C, and activation X3 is in the input operands 615B-615D. These activations can be broadcasted between the input operands.

Figure 7:
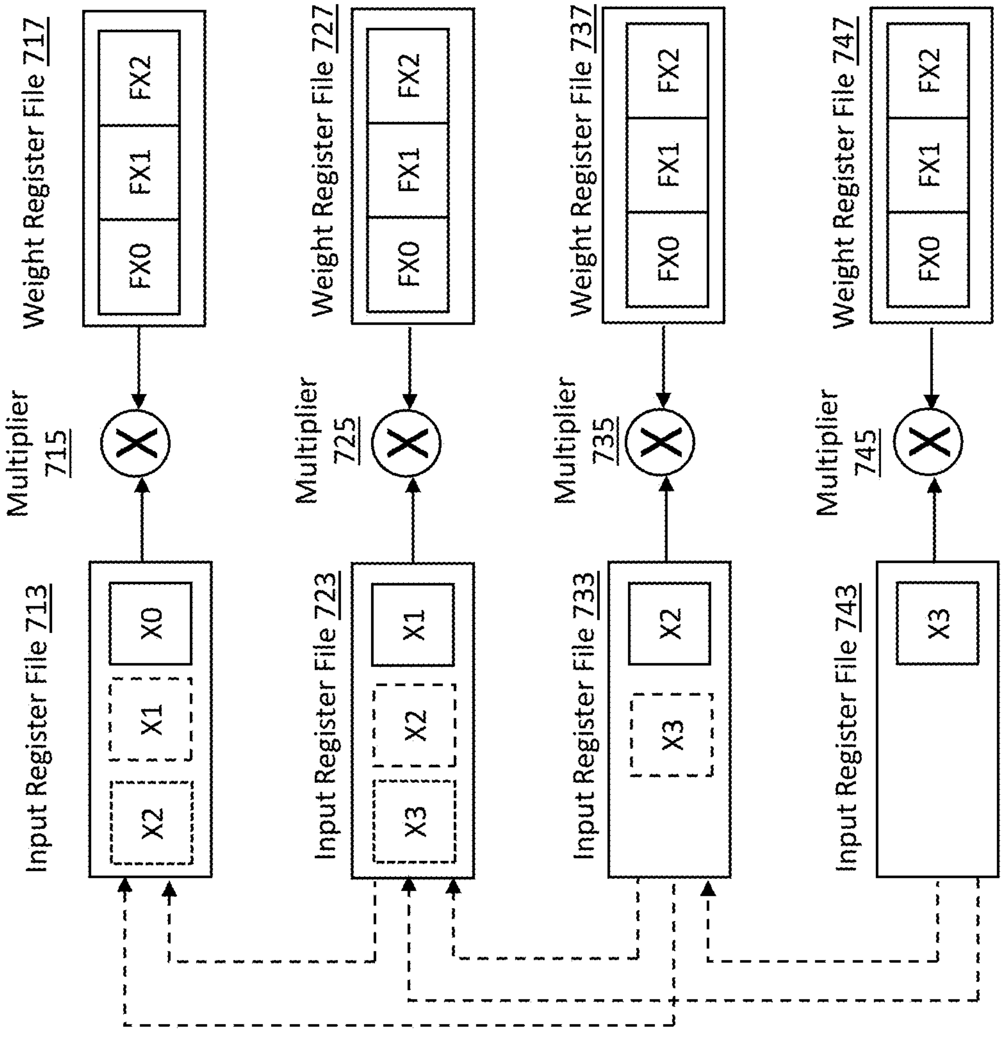
FIG. 7 illustrates an example process of broadcasting activations between processing elements (PEs), in accordance with various embodiments.

FIG. 7 illustrates an example process of broadcasting activations between PEs, in accordance with various embodiments. For purpose of illustration, activations in FIG. 7 are the activations X0, X1, X2, and X3 in FIG. 6. FIG. 7 includes four PEs. The first PE includes an input register file 713 for storing an input operand, a weight register file 717 for storing the weight operand, and a multiplier 715. The second PE includes an input register file 723 for storing an input operand, a weight register file 727 for storing the weight operand, and a multiplier 725. The third PE includes an input register file 733 for storing an input operand, a weight register file 737 for storing the weight operand, and a multiplier 735. The fourth PE includes an input register file 743 for storing an input operand, a weight register file 747 for storing the weight operand, and a multiplier 745. Even though not shown in FIG. 7, the PEs may include one or more accumulators.

The first PE performs MAC operations on the input operand 615A, which includes activations X0, X1, and X2. The second PE performs MAC operations on the input operand 615B, which includes activations X1, X2, and X3. The third PE performs MAC operations on the input operand 615C, which includes activations X2 and X3. The fourth PE performs MAC operations on the input operand 615A, which includes activations X3. In the embodiments of FIG. 7, the four activations are read from a memory, e.g., the memory 310, into the PEs through four read operations. In the first read operation, activation X0 is read into the input register file 713. In the second read operation, activation X1 is read into the input register file 723. In the third read operation, activation X2 is read into the input register file 723. In the fourth read operation, activation X3 is read into the input register file 743. The four read operations may occur at different times.

Each activation can be populated into up to 3 other input register files. For instance, activations X1 and X2 in the input operand 615A are broadcasted from the input register files 723 and 733, respectively, into the input register file 713, as shown by the dashed arrows in FIG. 7. Similarly, activations X2 and X3 in the input operand 615B are broadcasted from the input register files 733 and 743, respectively, into the input register file 723. Activation X3 in the input operand 615C is broadcasted from the input register file 743 into the input register file 733. With the activation broadcasting, no additional read operations are needed. The total number of read operations for this round of MAC operations by the four PEs is four.

In contrast, in a DNN accelerator that performs 1×1 kernel decomposition, the tensor 610 may be divided into 16 input operands, each of which includes one activation. 16 PEs will be needed to perform the MAC operations. As the 16 PEs do not share any activations, 16 read operations are needed. In a DNN accelerator that performs 1×3 kernel decomposition but does not perform activation broadcasting, the DNN accelerator needs to read in 9 activations, i.e., 3 activations for the first PE, 3 activations for the second PE, two activations for the third PE, and one activation for the fourth PE. Compared with both DNN accelerators, the DNN accelerator 300 reads in less activations and can be more efficient. The advantage of activation broadcasting can be more significant in cases where the input tensor has a larger width.

FIG. 8 illustrates another example process of broadcasting activations between PEs, in accordance with various embodiments. In the embodiments of FIG. 8, four PEs (PE0-PE3) performs MAC operations with a tensor, which may be an input tensor or a portion of an input tensor of a convolution. The tensor has a width of 18 and includes 18 activations: X0-X17. For purpose of simplicity and illustration, the Y coordinates of the activations are not shown in FIG. 8. In an embodiment where 1×3 kernel decomposition is performed, the 18 activations constitute 16 input operands, each input operand includes three activations. In other embodiments, the kernel decomposition may be 1×N kernel decomposition, where N is not 3. For instance, N may be 2, 4, 5, etc. Also, for purpose of simplicity and illustration, FIG. 8 shows four PEs. In other embodiments, there can be a different number of PEs.

FIG. 8 shows a table that illustrates the activation broadcasting process. The top row of the table shows 18 time slots (also referred to as clocks): T0 to T17. The first column of the table lists the four PEs. The main body of the table identifies which activation is being loaded into the internal memory of a particular PE at a particular time slot. For instance, at T0, which is the first time slot, the internal memory of PE0 receives activation X0 through a read operation. No other PEs receive activations. At T1, both PE0 and PE1 receive activation X1. The PE1 may receive activation X1 through a read operation, but PE0 may receive activation X1 through broadcasting the activation from PE1. At T2, PE0, PE1, and PE2 all receive action X2. The PE2 may receive activation X2 through a read operation, but PE0 and PE1 may receive the activation through broadcasting from PE2. As T2 finishes, the internal memory of PE0 has three activations X0-X2, which may constitute an input operand for PE0. PE0 can perform MAC operations on the input operand and the corresponding weight operand, a result of the MAC operations may be a data point in the output tensor of the convolution.

At T3, PE1, PE2, and PE3 all receive action X3. The PE3 may receive activation X3 through a read operation, but PE1 and PE2 may receive the activation through broadcasting from PE3. As T3 finishes, the internal memory of PE1 has three activations X1-X3, which constitutes another input operand, and the PE1 can perform MAC operations on the input operand and the corresponding weight operand. A result of the MAC operations may be another data point in the output tensor of the convolution. This process continues until all the input operands are loaded into the PEs.

FIG. 8 also shows reuse rates of the 18 activations in the last row of the table. The reuse rates of activations X0 and X17 are 1, meaning these activations are used by one PE. The reuse rates of activations X1 and X16 are 2, meaning these activations are used by two PEs, despite that each of them requires a single read operation. The reuse rates of the other activations X2-X15 are 3, meaning these activations are used by three PEs.

With the activation broadcasting, 18 read operations are needed for loading all the input operands. Without the activation broadcasting, 48 (16*3) read operations are needed for loading all the input operands. Thus, the activation broadcasting significantly reduces the number of read operations. As the loading of the internal memories increases, the utilization of the PEs can be improved. Additionally, even though some currently available DNN accelerators can use one data read module to feed multiple PE internal memories, the activation broadcasting still improves efficiency of writing data into the internal memories. The currently available DNN accelerators usually use one data read module to feed two internal memories and therefore, there can be two writes from one read operation. In contrast, with the activation broadcasting, there are 48 writes from 18 read operations, so the average number of writes is 48/18=2.667, which is better than two. Thus, the DNN accelerator 300 has better performance than the currently available DNN accelerators.

Example PE Array

Figure 9:
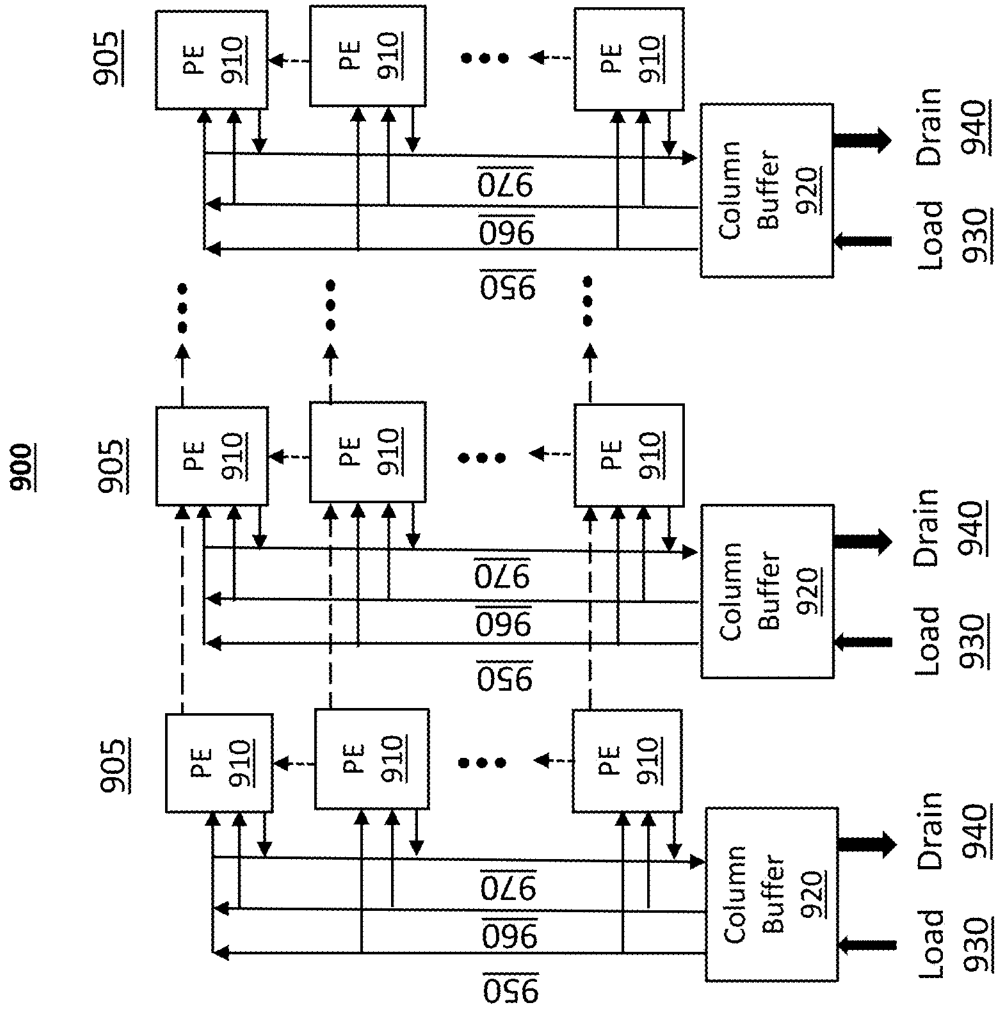
FIG. 9 illustrates an example PE array, in accordance with various embodiments.

FIG. 9 illustrates a PE array 900, in accordance with various embodiments. The PE array 900 may be an embodiment of one or more of the PE array 340 in FIG. 3. The PE array 900 includes a plurality of PEs 910 (individually referred to as "PE 910"). The PEs 910 perform MAC operations, such as integer MAC operations, floating-point MAC operations, and so on. The PEs 910 may also be referred to as neurons or nodes in the DNN. Each PE 910 has 2 input signals 950 and 960 and an output signal 970. The input signal 950 is a portion of an input tensor of a convolution, e.g., an input operand in the input tensor. The input signal 960 is at least a portion of a filter of the convolution, e.g., a weight operand generated from the filter. In some embodiments, the input signal 950 of a PE 910 includes one or more input operands, and the input signal 960 includes one or more weight operands.

Each PE 910 performs an MAC operation on the input signals 950 and 960 and outputs the output signal 970, which is a result of the MAC operation. Some or all of the input signals 950 and 960 and the output signal 970 may be in an integer format, such as INT8, or FP (floating-point) format, such as FP16 or BF16. For purpose of simplicity and illustration, the input signals and output signal of all the PEs 910 have the same reference numbers, but the PEs 910 may receive different input signals and output different output signals from each other. Also, a PE 910 may be different from another PE 910, e.g., including more, fewer, or different components.

As shown in FIG. 9, the PEs 910 are connected to each other, as indicated by the dash arrows in FIG. 9. The PEs 910 may share activations with each other. For instance, an activation can be broadcasted from a PE 910 to one or more other PEs 910. Also, the output signal 970 of an PE 910 may be sent to many other PEs 910 (and possibly back to itself) as input signals via the interconnections between PEs 910. In some embodiments, the output signal 970 of an PE 910 may incorporate the output signals of one or more other PEs 910 through an accumulate operation of the PE 910 and generates an internal partial sum of the PE array.

In the embodiments of FIG. 9, the PEs 910 are arranged into columns 905 (individually referred to as "column 905"). The input and weights of the layer may be distributed to the PEs 910 based on the columns 905. Each column 905 has a column buffer 920. The column buffer 920 stores data provided to the PEs 910 in the column 905 for a short amount of time. The column buffer 920 may also store data output by the last PE 910 in the column 905. The output of the last PE 910 may be a sum of the MAC operations of all the PEs 910 in the column 905, which is a column-level internal partial sum of the PE array 900. In other embodiments, input and weights may be distributed to the PEs 910 based on rows in the PE array 900. The PE array 900 may include row buffers in lieu of column buffers 920. A row buffer may store input signals of the PEs in the corresponding row and may also store a row-level internal partial sum of the PE array 900.

As shown in FIG. 9, each column buffer 920 is associated with a load 930 and a drain 940. The data provided to the column 905 is transmitted to the column buffer 920 through the load 930, e.g., through upper memory hierarchies, e.g., the memory 310 in FIG. 3. The data generated by the column 905 is extracted from the column buffers 920 through the drain 940. In some embodiments, data extracted from a column buffer 920 is sent to upper memory hierarchies, e.g., the memory 310 in FIG. 3, through the drain operation. In some embodiments, the drain operation does not start until all the PEs 910 in the column 905 has finished their MAC operations. In some embodiments, the load 930 or drain 940 may be controlled by the data read module 360 in FIG. 3.

Figure 10:
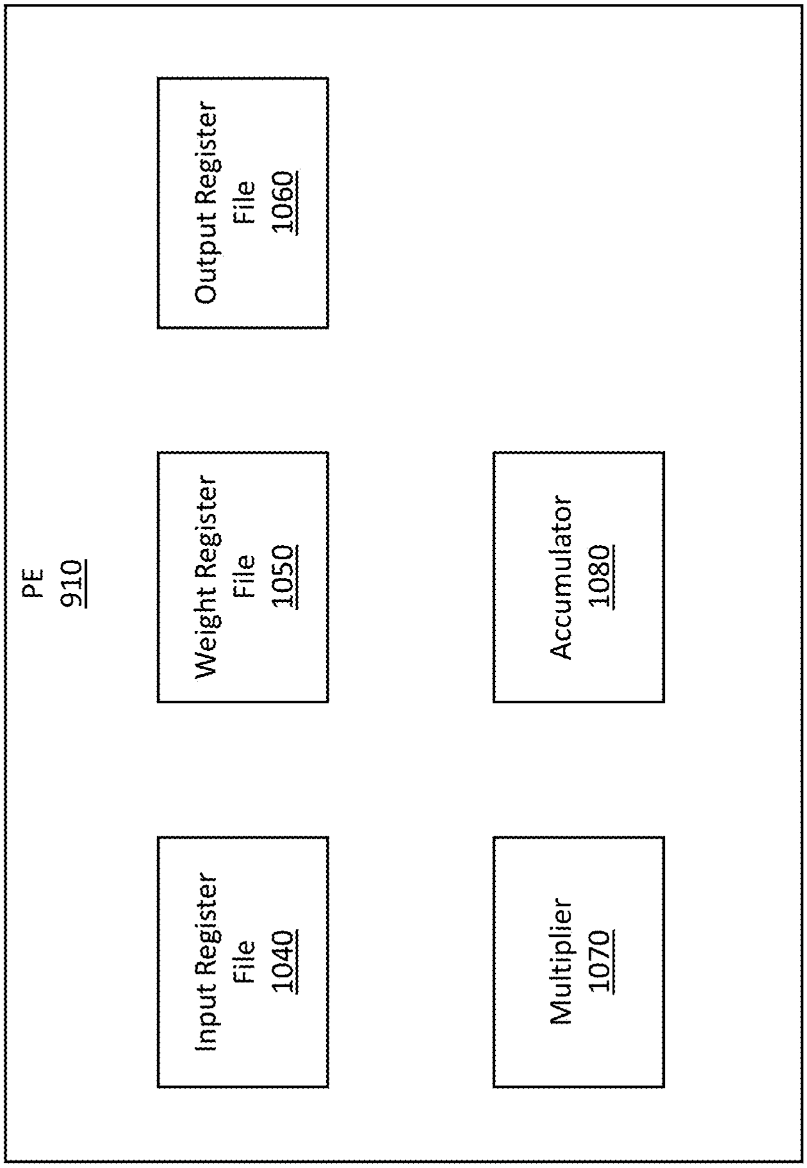
FIG. 10 is a block diagram of an example PE, in accordance with various embodiments.

FIG. 10 is a block diagram of a PE 910, in accordance with various embodiments. The PE 910 in FIG. 9 includes an input register file 1040, a weight register file 1050, an output register file 1060, a multiplier 1070, and an accumulator 1080. In other embodiments, the PE 910 may include fewer, more, or different components.

The input register file 1040 temporarily stores input signals received by the PE 910. The input signals may include an input operand, e.g., an input operand 615 in FIG. 6. The input signals may also include output signals from other PEs 1010. The weight register file 1050 temporarily stores weights received by the PE 910. The output register file 1060 temporarily stores output signals generated by the PE 910. For purpose of illustration and simplicity, the PE 910 in FIG. 10B includes one input register file 1040, one weight register file 1050, one output register file 1060. In other embodiments, a PE 910 may include multiple register files for each type of data.

The multiplier 1070 performs multiply operations on activations in the input register file 1040 and weights in the weight register file 1050. The amount of time needed by the multiplier 1070 for a multiple operation depends on the sparsity level of the weights used in the multiple operation. If the weights are denser (i.e., the sparsity level is lower), the multiplier 1070 needs more time to perform the multiple operation.

The accumulator 1080 performs accumulate operations on the output of the multiplier 1070 and outputs signals from other PEs. The output of the accumulator 1080 is the output signal of the PE 910, which can be stored in the output register file 560. The output signal may be provided to another PE in the same PE array 900 or provided to another PE array.

Example Method of DL

Figure 11:
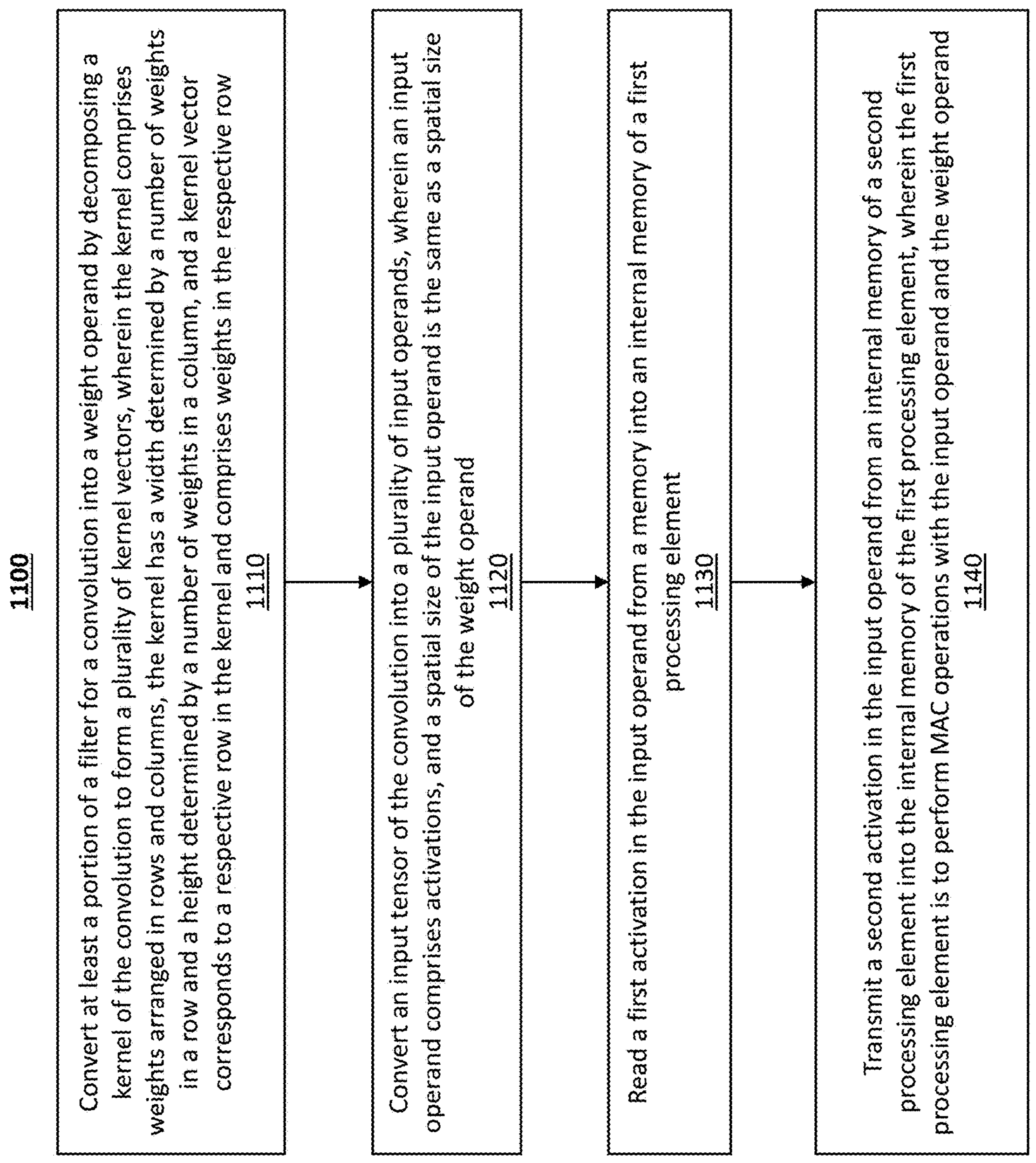
FIG. 11 is a flowchart showing a method of deep learning, in accordance with various embodiments.

FIG. 11 is a flowchart showing a method of DL, in accordance with various embodiments. The method 1100 may be performed by the DNN accelerator 300 in FIG. 3. Although the method 1100 is described with reference to the flowchart illustrated in FIG. 11, many other methods for DL may alternatively be used. For example, the order of execution of the steps in FIG. 11 may be changed. As another example, some of the steps may be changed, eliminated, or combined.

The DNN accelerator 300 converts at least a portion of a filter for a convolution into a weight operand by decomposing a kernel of the convolution to form a plurality of kernel vectors. The kernel comprises weights arranged in rows and columns. The kernel has a width determined by a number of weights in a row and a height determined by a number of weights in a column. A kernel vector corresponds to a respective row in the kernel and comprises weights in the respective row. A kernel vector may have a spatial size of 1×N, where is N an integer that is larger than one and not larger than the width of the kernel.

In some embodiments, the number of the weights in the kernel vector is not an integral divisor of the width of the kernel. The DNN accelerator 300 may decompose the kernel to form the plurality of kernel vectors by generating an expanded kernel by adding one or more columns of new weights into the kernel. The one or more columns of new weights may be added to an edge of the kernel. The number of the weights in the kernel vector is an integral divisor of a width of the expanded kernel. The DNN accelerator 300 may decompose the expanded kernel into the plurality of kernel vectors. Some of the kernel vectors include the new weights. The new weights may have a value of zero.

The DNN accelerator 300 also converts 1120 an input tensor of the convolution to form a plurality of input operands. The input operand comprises activations. A spatial size of the input operand is the same as a spatial size of the weight operand. In some embodiments, a number of the activations in the input operand equals the number of the weights in the kernel vector.

The DNN accelerator 300 reads 1130 a first activation in the output operand from a memory into an internal memory of a first PE. The read of the first activation may be done through one read operation. The DNN accelerator 300 may also read the weight operand from the memory into another internal memory of the first PEs. The memory may be a memory associated with a PE array that includes the first PE.

The DNN accelerator 300 transmits 1140 a second activation in the input operand from a second PE into the internal memory of the first PE. The PE is to perform MAC operations based on the input operand and the weight operand. In some embodiments, a result of the MAC operations is an output element in the output tensor of the convolution. In some embodiments, the first activation is read into the internal memory of the first PE at a first time. The second activation is transmitted into the internal memory of the first PE at a second time. The first time is different from the second time. The DNN accelerator 300 may read second activation from the memory into the internal memory of the second PE The DNN accelerator 300 may transmit a third activation in the input operand from an internal memory of a third PE into the internal memory of the first PE. In some embodiments, the second activation is transmitted into the internal memory of the first PE at a first time. The third activation is transmitted into the internal memory of the first PE at a second time. The first time is earlier than the second time. The second activation is arranged between the first activation and the third activation in the input operand.

In some embodiments, the second PE receives a third activation from an internal memory of a third PE. The second PE performs MAC operations with another input operand that includes the second activation and the third activation.

Example DL Environment

Figure 12:
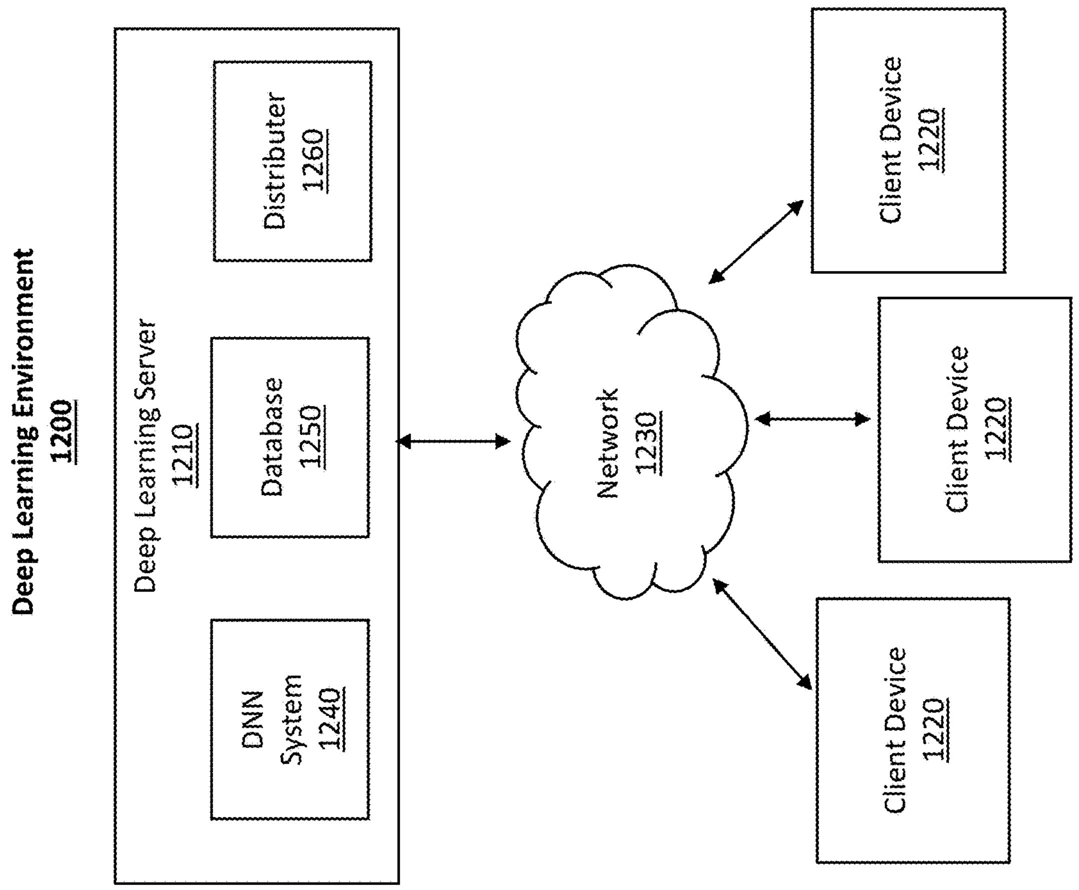
FIG. 12 illustrates a deep learning (DL) environment, in accordance with various embodiments.

FIG. 12 illustrates a DL environment 1200, in accordance with various embodiments. The DL environment 1200 includes a DL server 1210 and a plurality of client devices 1220 (individually referred to as client device 1220). The DL server 1210 is connected to the client devices 1220 through a network 1230. In other embodiments, the DL environment 1200 may include fewer, more, or different components.

The DL server 1210 trains DL models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 1210 can use various types of neural networks, such as DNN, recurrent neural network (RNN), generative adversarial network (GAN), long short-term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 1210 may build DL models specific to particular types of problems that need to be solved. A DL model is trained to receive an input and outputs the solution to the particular problem.

In FIG. 12, the DL server 1210 includes a DNN system 1240, a database 1250, and a distributer 1260. The DNN system 1240 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1240 trains DNNs through knowledge distillation, e.g., dense-connection based knowledge distillation. The trained DNNs may be used on low memory systems, like mobile phones, IOT edge devices, and so on. An embodiment of the DNN system 1240 is the DNN accelerator 200 described above in conjunction with FIG. 2.

The database 1250 stores data received, used, generated, or otherwise associated with the DL server 1210. For example, the database 1250 stores a training dataset that the DNN system 1240 uses to train DNNs. In an embodiment, the training dataset is an image gallery that can be used to train a DNN for classifying images. The training dataset may include data received from the client devices 1220. As another example, the database 1250 stores hyperparameters of the neural networks built by the DL server 1210.

The distributer 1260 distributes DL models generated by the DL server 1210 to the client devices 1220. In some embodiments, the distributer 1260 receives a request for a DNN from a client device 1220 through the network 1230. The request may include a description of a problem that the client device 1220 needs to solve. The request may also include information of the client device 1220, such as information describing available computing resource on the client device. The information describing available computing resource on the client device 1220 can be information indicating network bandwidth, information indicating available memory size, information indicating processing power of the client device 1220, and so on. In an embodiment, the distributer may instruct the DNN system 1240 to generate a DNN in accordance with the request. The DNN system 1240 may generate a DNN based on the information in the request. For instance, the DNN system 1240 can determine the structure of the DNN and/or train the DNN in accordance with the request.

In another embodiment, the distributer 1260 may select the DNN from a group of pre-existing DNNs based on the request. The distributer 1260 may select a DNN for a particular client device 1220 based on the size of the DNN and available resources of the client device 1220. In embodiments where the distributer 1260 determines that the client device 1220 has limited memory or processing power, the distributer 1260 may select a compressed DNN for the client device 1220, as opposed to an uncompressed DNN that has a larger size. The distributer 1260 then transmits the DNN generated or selected for the client device 1220 to the client device 1220.

In some embodiments, the distributer 1260 may receive feedback from the client device 1220. For example, the distributer 1260 receives new training data from the client device 1220 and may send the new training data to the DNN system 1240 for further training the DNN. As another example, the feedback includes an update of the available computer resource on the client device 1220. The distributer 1260 may send a different DNN to the client device 1220 based on the update. For instance, after receiving the feedback indicating that the computing resources of the client device 1220 have been reduced, the distributer 1260 sends a DNN of a smaller size to the client device 1220.

The client devices 1220 receive DNNs from the distributer 1260 and applies the DNNs to perform machine learning tasks, e.g., to solve problems or answer questions. In various embodiments, the client devices 1220 input images into the DNNs and uses the output of the DNNs for various applications, e.g., visual reconstruction, augmented reality, robot localization and navigation, medical diagnosis, weather prediction, and so on. A client device 1220 may be one or more computing devices capable of receiving user input as well as transmitting and/or receiving data via the network 1230. In one embodiment, a client device 1220 is a conventional computer system, such as a desktop or a laptop computer. Alternatively, a client device 1220 may be a device having computer functionality, such as a personal digital assistant (PDA), a mobile telephone, a smartphone, an autonomous vehicle, or another suitable device. A client device 1220 is configured to communicate via the network 1230. In one embodiment, a client device 1220 executes an application allowing a user of the client device 1220 to interact with the DL server 1210 (e.g., the distributer 1260 of the DL server 1210). The client device 1220 may request DNNs or send feedback to the distributer 1260 through the application. For example, a client device 1220 executes a browser application to enable interaction between the client device 1220 and the DL server 1210 via the network 1230. In another embodiment, a client device 1220 interacts with the DL server 1210 through an application programming interface (API) running on a native operating system of the client device 1220, such as IOS® or ANDROID™.

In an embodiment, a client device 1220 is an integrated computing device that operates as a standalone network-enabled device. For example, the client device 1220 includes display, speakers, microphone, camera, and input device. In another embodiment, a client device 1220 is a computing device for coupling to an external media device such as a television or other external display and/or audio output system. In this embodiment, the client device 1220 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1220 may be configured to be compatible with a generic external media device that does not have specialized software, firmware, or hardware specifically for interacting with the client device 1220.

The network 1230 supports communications between the DL server 1210 and client devices 1220. The network 1230 may comprise any combination of local area and/or wide area networks, using both wired and/or wireless communication systems. In one embodiment, the network 1230 may use standard communications technologies and/or protocols. For example, the network 1230 may include communication links using technologies such as Ethernet, 12010.11, worldwide interoperability for microwave access (WiMAX), 3G, 4G, code division multiple access (CDMA), digital subscriber line (DSL), etc. Examples of networking protocols used for communicating via the network 1230 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1230 may be represented using any suitable format, such as hypertext markup language (HTML) or extensible markup language (XML). In some embodiments, all or some of the communication links of the network 1230 may be encrypted using any suitable technique or techniques.

Example DNN System

Figure 13:
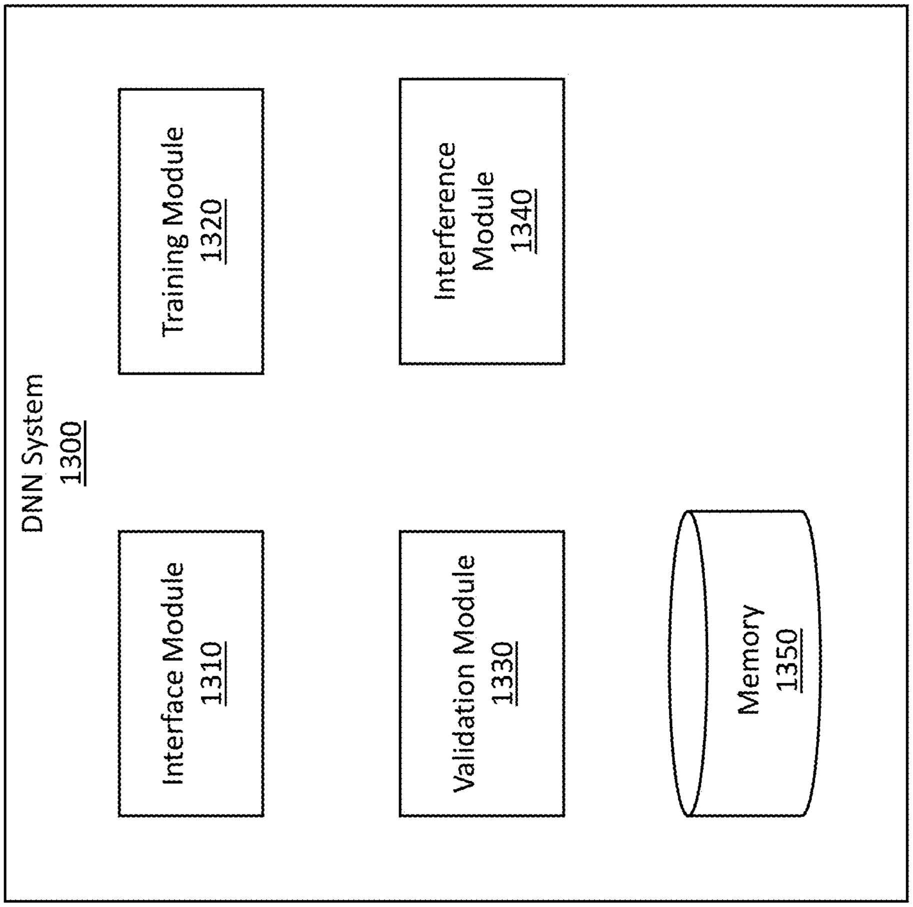
FIG. 13 is a block diagram of an example DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 1400.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the DL algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the DL algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 determines may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of FALUs), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
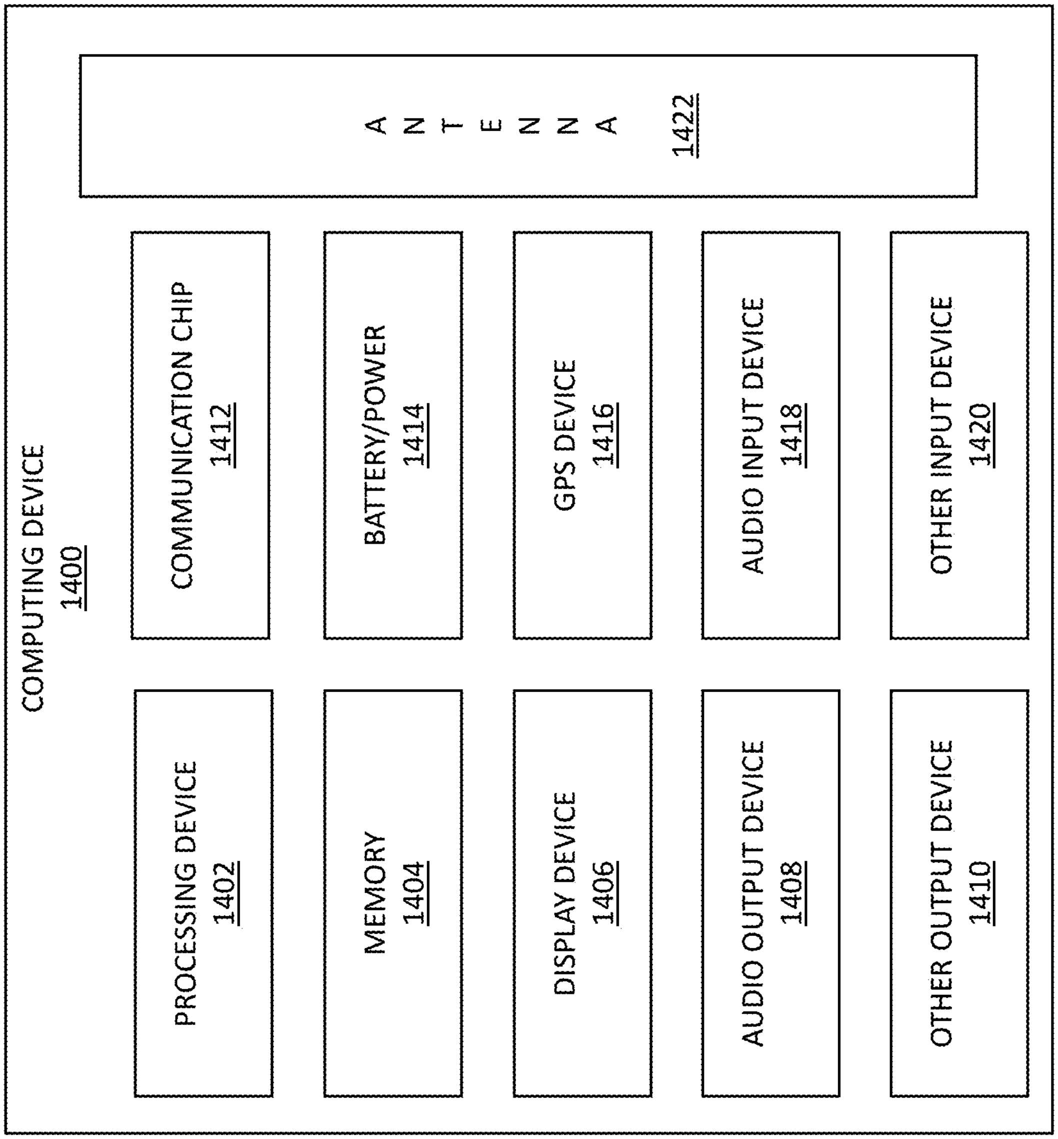
FIG. 14 is a block diagram of an example computing device, in accordance with various embodiments.

FIG. 14 is a block diagram of an example computing device 1400, in accordance with various embodiments. In some embodiments, the computing device 1400 can be used as the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform operations for DL, e.g., the method 1100 described above in conjunction with FIG. 11 or some operations performed by the DNN accelerator 300 described above in conjunction with FIG. 3. The instructions stored in the one or more non-transitory computer-readable media may be executed by the processing device 2402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (register fileID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

SELECT EXAMPLES

The following paragraphs provide various examples of the embodiments disclosed herein.

Example 1 provides a method of DL, the method including converting at least a portion of a filter for a convolution into a weight operand by decomposing a kernel of the convolution to form a plurality of kernel vectors, where the kernel includes weights arranged in rows and columns, the kernel has a width determined by a number of weights in a row and a height determined by a number of weights in a column, and a kernel vector corresponds to a respective row in the kernel and includes weights in the respective row; converting an input tensor of the convolution into a plurality of input operands, where an input operand includes activations, and a spatial size of the input operand is the same as a spatial size of the weight operand; reading a first activation in the input operand from a memory into an internal memory of a first PE; and transmitting a second activation in the input operand from an internal memory of a second PE into the internal memory of the first PE, where the first PE is to perform MAC operations with the input operand and the weight operand.

Example 2 provides the method of example 1, where the number of the weights in the kernel vector is not an integral divisor of the width of the kernel, decomposing the kernel to form the plurality of kernel vectors includes generating an expanded kernel by adding one or more columns of new weights into the kernel, and the number of the weights in the kernel vector is an integral divisor of a width of the expanded kernel.

Example 3 provides the method of example 2, where the new weights have a value of zero.

Example 4 provides the method of any of the preceding claims, further including reading the weight operand from the memory into another internal memory of the PE.

Example 5 provides the method of any of the preceding claims, where a result of the MAC operation is a data point in an output tensor of the convolution.

Example 6 provides the method of any of the preceding claims, further including transmitting a third activation in the input operand from an internal memory of a third PE into the internal memory of the first PE.

Example 7 provides the method of example 6, where the second activation is transmitted into the internal memory of the first PE at a first time, the third activation is transmitted into the internal memory of the first PE at a second time, the first time is earlier than the second time, and the second activation is arranged between the first activation and the third activation in the input operand.

Example 8 provides the method of any of the preceding claims, where the first activation is read into the internal memory of the first PE at a first time, and the second activation is transmitted into the internal memory of the first PE at a second time, and the first time is different from the second time.

Example 9 provides the method of any of the preceding claims, further includes reading the second activation from the memory into the internal memory of the second PE.

Example 10 provides the method of any of the preceding claims, where the second PE receives a third activation from an internal memory of a third PE, and the second PE performs MAC operations with another input operand that includes the second activation and the third activation.

Example 11 provides one or more non-transitory computer-readable media storing instructions executable to perform operations for DL, the operations including converting at least a portion of a filter for a convolution into a weight operand by decomposing a kernel of the convolution to form a plurality of kernel vectors, where the kernel includes weights arranged in rows and columns, the kernel has a width determined by a number of weights in a row and a height determined by a number of weights in a column, and a kernel vector corresponds to a respective row in the kernel and includes weights in the respective row; converting an input tensor of the convolution into a plurality of input operands, where an input operand includes activations, and a spatial size of the input operand is the same as a spatial size of the weight operand; reading a first activation in the input operand from a memory into an internal memory of a first PE; and transmitting a second activation in the input operand from an internal memory of a second PE into the internal memory of the first PE, where the first PE is to perform MAC operations with the input operand and the weight operand.

Example 12 provides the one or more non-transitory computer-readable media of example 11, where the number of the weights in the kernel vector is not an integral divisor of the width of the kernel, decomposing the kernel to form the plurality of kernel vectors includes generating an expanded kernel by adding one or more columns of new weights into the kernel, and the number of the weights in the kernel vector is an integral divisor of a width of the expanded kernel.

Example 13 provides the one or more non-transitory computer-readable media of example 12, where the new weights have a value of zero.

Example 14 provides the one or more non-transitory computer-readable media of any one of examples 11-13, where the operations further include reading the weight operand from the memory into another internal memory of the PE.

Example 15 provides the one or more non-transitory computer-readable media of any one of examples 11-14, where a result of the MAC operation is a data point in an output tensor of the convolution.

Example 16 provides the one or more non-transitory computer-readable media of any one of examples 11-16, where the operations further include transmitting a third activation in the input operand from an internal memory of a third PE into the internal memory of the first PE.

Example 17 provides the one or more non-transitory computer-readable media of example 16, where the second activation is transmitted into the internal memory of the first PE at a first time, the third activation is transmitted into the internal memory of the first PE at a second time, the first time is earlier than the second time, and the second activation is arranged between the first activation and the third activation in the input operand Example 18 provides the one or more non-transitory computer-readable media of any one of examples 11-17, where the first activation is read into the internal memory of the first PE at a first time, and the second activation is transmitted into the internal memory of the first PE at a second time, and the first time is different from the second time.

Example 19 provides the one or more non-transitory computer-readable media of any one of examples 11-18, where the operations further include reading the second activation from the memory into the internal memory of the second PE.

Example 20 provides the one or more non-transitory computer-readable media of any one of examples 11-19, where the second PE receives a third activation from an internal memory of a third PE, and the second PE performs MAC operations with another input operand that includes the second activation and the third activation.

Example 21 provides a DNN accelerator, the DNN accelerator including a kernel decomposing module configured to convert at least a portion of a filter for a convolution into a weight operand by decomposing a kernel of the convolution to form a plurality of kernel vectors, where the kernel includes weights arranged in rows and columns, the kernel has a width determined by a number of weights in a row and a height determined by a number of weights in a column, and a kernel vector corresponds to a respective row in the kernel and includes weights in the respective row; a tensor decomposing module configured to convert an input tensor of the convolution into a plurality of input operands, where an input operand includes activations, and a spatial size of the input operand is the same as a spatial size of the weight operand; a data read module configured to a first activation in the input operand from a memory into an internal memory of a first PE; and a PE array, the PE array including the first PE and a second PE, where the first PE receives a second activation from the input operand from an internal memory of the second PEs and performs MAC operations based on the input operand and the weight operand.

Example 22 provides the DNN accelerator of example 21, where the number of the weights in the kernel vector is not an integral divisor of the width of the kernel, the tensor decomposing module is configured to decompose the kernel to form the plurality of kernel vectors by generating an expanded kernel by adding one or more columns of new weights into the kernel, and the number of the weights in the kernel vector is an integral divisor of a width of the expanded kernel.

Example 23 provides the DNN accelerator of example 21 or 22, where the data read module is further configured to read the weight operand from the memory into another internal memory of the PE.

Example 24 provides the DNN accelerator of any one of examples 21-23, where the first PE receives a third activation in the input operand from an internal memory of a third PE in the PE array.

Example 25 provides the DNN accelerator of any one of examples 21-24, where the first activation is read into the internal memory of the first PE at a first time, and the first PE receives the second activation at a second time, and the first time is different from the second time.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method of deep learning, the method comprising:

converting at least a portion of a filter for a convolution into a weight operand by decomposing a kernel of the convolution to form a plurality of kernel vectors, wherein the kernel comprises weights arranged in rows and columns, the kernel has a width determined by a number of weights in a row and a height determined by a number of weights in a column, and a kernel vector corresponds to a respective row in the kernel and comprises weights in the respective row;

converting an input tensor of the convolution into a plurality of input operands, wherein an input operand comprises activations, and a spatial size of the input operand is the same as a spatial size of the weight operand;

reading a first activation in the input operand from a memory into an internal memory of a first processing element; and transmitting a second activation in the input operand from an internal memory of a second processing element into the internal memory of the first processing element, wherein the first processing element is to perform multiply-accumulate (MAC) operations with the input operand and the weight operand, wherein the number of the weights in the kernel vector is not an integral divisor of the width of the kernel, decomposing the kernel to form the plurality of kernel vectors comprises generating an expanded kernel by adding one or more columns of new weights into the kernel, and the number of the weights in the kernel vector is an integral divisor of a width of the expanded kernel.

2. The method of claim 1, wherein the new weights have a value of zero.

3. The method of claim 1, further comprising:

reading the weight operand from the memory into another internal memory of the first processing element.

4. The method of claim 1, wherein a result of the MAC operation is a data point in an output tensor of the convolution.

5. The method of claim 1, further comprising:
transmitting a third activation in the input operand from an internal memory of a third processing element into the internal memory of the first processing element.

6. The method of claim 5, wherein:
the second activation is transmitted into the internal memory of the first processing element at a first time,
the third activation is transmitted into the internal memory of the first processing element at a second time,
the first time is earlier than the second time, and
the second activation is located between the first activation and the third activation in the input operand.

7. The method of claim 1, wherein the first activation is read into the internal memory of the first processing element at a first time, and the second activation is transmitted into the internal memory of the first processing element at a second time, and the first time is different from the second time.

8. The method of claim 1, further comprises:
reading the second activation from the memory into the internal memory of the second processing element.

9. The method of claim 1, wherein the second processing element receives a third activation from an internal memory of a third processing element, and the second processing element performs MAC operations with another input operand that includes the second activation and the third activation.

10. One or more non-transitory computer-readable media storing instructions executable to perform operations for deep learning, the operations comprising:
converting at least a portion of a filter for a convolution into a weight operand by decomposing a kernel of the convolution to form a plurality of kernel vectors, wherein the kernel comprises weights arranged in rows and columns, the kernel has a width determined by a number of weights in a row and a height determined by a number of weights in a column, and a kernel vector corresponds to a respective row in the kernel and comprises weights in the respective row;
converting an input tensor of the convolution into a plurality of input operands, wherein an input operand comprises activations, and a spatial size of the input operand is the same as a spatial size of the weight operand;
reading a first activation in the input operand from a memory into an internal memory of a first processing element; and
transmitting a second activation in the input operand from an internal memory of a second processing element into the internal memory of the first processing element, wherein the first processing element is to perform multiply-accumulate (MAC) operations with the input operand and the weight operand,
wherein the number of the weights in the kernel vector is not an integral divisor of the width of the kernel, decomposing the kernel to form the plurality of kernel vectors comprises generating an expanded kernel by adding one or more columns of new weights into the kernel, and the number of the weights in the kernel vector is an integral divisor of a width of the expanded kernel.

11. The one or more non-transitory computer-readable media of claim 10, wherein the new weights have a value of zero.

12. The one or more non-transitory computer-readable media of claim 10, wherein the operations further comprise:
reading the weight operand from the memory into another internal memory of the first processing element.

13. The one or more non-transitory computer-readable media of claim 10, wherein a result of the MAC operation is a data point in an output tensor of the convolution.

14. The one or more non-transitory computer-readable media of claim 10, wherein the operations further comprise:
transmitting a third activation in the input operand from an internal memory of a third processing element into the internal memory of the first processing element.

15. The one or more non-transitory computer-readable media of claim 14, wherein:
the second activation is transmitted into the internal memory of the first processing element at a first time,
the third activation is transmitted into the internal memory of the first processing element at a second time,
the first time is earlier than the second time, and
the second activation is located between the first activation and the third activation in the input operand.

16. The one or more non-transitory computer-readable media of claim 10, wherein the first activation is read into the internal memory of the first processing element at a first time, and the second activation is transmitted into the internal memory of the first processing element at a second time, and the first time is different from the second time.

17. The one or more non-transitory computer-readable media of claim 10, wherein the operations further comprise:
reading the second activation from the memory into the internal memory of the second processing element.

18. The one or more non-transitory computer-readable media of claim 10, wherein the second processing element receives a third activation from an internal memory of a third processing element, and the second processing element performs MAC operations with another input operand that includes the second activation and the third activation.

19. A deep neural network (DNN) accelerator, the DNN accelerator comprising:
a kernel decomposing module configured to convert at least a portion of a filter for a convolution into a weight operand by decomposing a kernel of the convolution to form a plurality of kernel vectors, wherein the kernel comprises weights arranged in rows and columns, the kernel has a width determined by a number of weights in a row and a height determined by a number of weights in a column, and a kernel vector corresponds to a respective row in the kernel and comprises weights in the respective row;
a tensor decomposing module configured to convert an input tensor of the convolution into a plurality of input operands, wherein an input operand comprises activations, and a spatial size of the input operand is the same as a spatial size of the weight operand;
a data read module configured to read a first activation in the input operand from a memory into an internal memory of a first processing element; and
a processing element array, the processing element array comprising the first processing element and a second processing element, wherein the first processing element receives a second activation from the input operand from an internal memory of the second processing elements and performs multiply-accumulate (MAC) operations based on the input operand and the weight operand,
wherein the number of the weights in the kernel vector is not an integral divisor of the width of the kernel, the tensor decomposing module is configured to decompose the kernel to form the plurality of kernel vectors by generating an expanded kernel by adding one or more columns of new weights into the kernel, and the number of the weights in the kernel vector is an integral divisor of a width of the expanded kernel.

20. The DNN accelerator of claim 19, wherein the data read module is further configured to read the weight operand from the memory into another internal memory of the first processing element.

21. The DNN accelerator of claim 19, wherein the first processing element receives a third activation in the input operand from an internal memory of a third processing element in the processing element array.

22. The DNN accelerator of claim 19, wherein the first activation is read into the internal memory of the first processing element at a first time, and the first processing element receives the second activation at a second time, and the first time is different from the second time.

* * * * *